(12) United States Patent
Ma et al.

(10) Patent No.: US 11,038,620 B2
(45) Date of Patent: Jun. 15, 2021

(54) DOWNLINK INFORMATION TRANSMISSION METHOD AND APPARATUS, AND DEVICE

(71) Applicant: Huawei Technologies Co., Ltd., Shenzhen (CN)

(72) Inventors: Ruixiang Ma, Beijing (CN); Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 16/404,364

(22) Filed: May 6, 2019

(65) Prior Publication Data

US 2019/0260502 A1   Aug. 22, 2019

Related U.S. Application Data

(63) Continuation of application No. PCT/CN2017/103991, filed on Sep. 28, 2017.

(30) Foreign Application Priority Data

Nov. 4, 2016   (CN) .......................... 201610965310.6

(51) Int. Cl.
*H04W 4/00*   (2018.01)
*H04L 1/00*   (2006.01)
(Continued)

(52) U.S. Cl.
CPC .............. *H04L 1/0009* (2013.01); *H04L 1/00* (2013.01); *H04L 1/0042* (2013.01);
(Continued)

(58) Field of Classification Search
None
See application file for complete search history.

(56) References Cited

U.S. PATENT DOCUMENTS 9,191,951 B2   11/2015   Takeda et al.
2010/0322229 A1   12/2010   Kim et al.
(Continued)

FOREIGN PATENT DOCUMENTS

CN   101834692 A   9/2010
CN   102083223 A   6/2011
(Continued)

OTHER PUBLICATIONS

"MTC UE Behavior for Simultaneous Reception of Multiple Transport Blocks," 3GPP TSG-RAN WG1 Meeting #83, R1-156635, Anaheim, USA, pp. 1-10, 3rd Generation Partnership Project, Valbonne, France (Nov. 15-22, 2015).

*Primary Examiner* — Phirin Sam
(74) *Attorney, Agent, or Firm* — Leydig, Voit & Mayer, Ltd.

(57) ABSTRACT

This application provides a downlink information transmission method, apparatus, and a device. The method includes: encoding information into a plurality of transport blocks; determining a time-frequency resource used to send each transport block; sending downlink resource indication information to user equipment, where the downlink resource indication information indicates a time-frequency resource location occupied by an $M^{th}$ transport block; and sending corresponding transport blocks on the time-frequency resources. The user equipment receives the transport blocks based on the downlink resource indication information and decodes the transport blocks to obtain the information, where the downlink resource indication information indicates a resource of only one transport block. A terminal device may determine a time-frequency resource location of another transport block based on a location parameter of the another transport block, and receive and decode the another transport block. Same information bits are carried in a (Continued)

plurality of transport blocks, thereby improving transmission reliability.

18 Claims, 8 Drawing Sheets

(51) Int. Cl.
*H04W 72/04* (2009.01)
*H04L 5/00* (2006.01)
*H04W 72/08* (2009.01)
*H04L 1/18* (2006.01)
*H04L 1/08* (2006.01)
*H04L 1/02* (2006.01)

(52) U.S. Cl.
CPC .......... *H04L 1/0043* (2013.01); *H04L 1/0052* (2013.01); *H04L 1/0078* (2013.01); *H04L 5/00* (2013.01); *H04L 5/0007* (2013.01); *H04L 5/0044* (2013.01); *H04W 72/04* (2013.01); *H04W 72/042* (2013.01); *H04W 72/044* (2013.01); *H04W 72/087* (2013.01); *H04L 1/0061* (2013.01); *H04L 1/02* (2013.01); *H04L 1/08* (2013.01); *H04L 1/18* (2013.01)

(56) References Cited

U.S. PATENT DOCUMENTS

| | | | | |
|---|---|---|---|---|
| 2012/0113816 | A1* | 5/2012 | Bhattad | H04W 72/0426 370/246 |
| 2013/0163537 | A1* | 6/2013 | Anderson | H04W 72/1284 370/329 |
| 2014/0177519 | A1* | 6/2014 | Bhattad | H04L 25/0226 370/315 |
| 2016/0143011 | A1* | 5/2016 | Xia | H04L 5/0048 370/330 |
| 2018/0109352 | A1* | 4/2018 | Nammi | H04W 72/0413 |
| 2019/0020445 | A1* | 1/2019 | Kim | H04L 1/1861 |
| 2019/0166611 | A1* | 5/2019 | Noh | H04L 1/0072 |
| 2019/0261295 | A1* | 8/2019 | Peisa | H04W 72/0446 |
| 2019/0312669 | A1* | 10/2019 | Kwak | H04L 1/00 |
| 2020/0015241 | A1* | 1/2020 | Marinier | H04W 72/12 |
| 2020/0044788 | A1* | 2/2020 | Meyer | H04L 1/1854 |
| 2020/0305129 | A1* | 9/2020 | Lee | H04W 72/0446 |

FOREIGN PATENT DOCUMENTS

| | | |
|---|---|---|
| CN | 103181109 A | 6/2013 |
| CN | 104065453 A | 9/2014 |
| CN | 104144030 A | 11/2014 |
| CN | 105162553 A | 12/2015 |
| EP | 2106057 A1 | 9/2009 |

* cited by examiner

CONT. FROM FIG. 2A

CONT. FROM FIG. 2A

S206: Demodulate and decode the first transport block

S207: If the first transport block fails to be demodulated or decoded, determine, based on the first time-frequency resource location and the location parameter corresponding to the another transport block, a time-frequency resource location corresponding to a next transport block sent by the base station, and obtain the transport block that is received in the time-frequency resource location S208: Jointly demodulate and decode the transport block and all previously received transport blocks, if the transport block and all the previously received transport blocks fail to be demodulated or decoded, determine, based on the first time-frequency resource location and the location parameter corresponding to the another transport block, a resource location corresponding to a next transport block, obtain the transport block that is received in the time-frequency resource location, and repeat this step until a received transport block is successfully demodulated and decoded or all transport blocks sent by the base station are received S209: Send an acknowledgement message to the base station if a transport block is successfully demodulated and decoded S210: Send a failure message to the base station if all transport blocks sent by the base station fail to be jointly demodulated or decoded

FIG. 2B

DOWNLINK INFORMATION TRANSMISSION METHOD AND APPARATUS, AND DEVICE

CROSS-REFERENCE TO RELATED APPLICATIONS

This application is a continuation of International Application No. PCT/CN2017/103991, filed on Sep. 28, 2017, which claims priority to Chinese Patent Application No. 201610965310.6, filed on Nov. 4, 2016. The disclosures of the aforementioned applications are hereby incorporated by reference in their entireties.

TECHNICAL FIELD

Embodiments of this application relate to communications technologies, and in particular, to a downlink information transmission method and apparatus, and a device.

BACKGROUND

Committing to providing higher system performance, a 5G communications system will support a plurality of service types, different deployment scenarios, and a broader spectrum range. The plurality of service types include enhanced mobile broadband (eMBB for short), massive machine type communication (mMTC for short), ultra-reliable and low-latency communications (URLLC for short), multimedia broadcast multicast service (MBMS for short), positioning service, and the like. The different deployment scenarios include indoor hotspot (Indoor hotspot), dense urban (dense urban), a suburb, urban macro (Urban Macro), high-speed railway scenarios, and the like.

Compared with a 4G communications system, one feature of the 5G communications system is that a URLLC service is supported. There are a plurality of URLLC service types, and typical examples include industrial control, industrial production process automation, human computer interaction, telemedicine, and the like. To better quantize performance indices of a URLLC service to provide a reference input and evaluation criterion for designing a 5G system, the 3GPP RAN and RAN1 working groups define performance indices such as a latency, reliability, and a system capacity of the URLLC service, where the reliability is overall reliability of the URLLC service. To meet this requirement, impact of all channels involved in transmission needs to be considered, that is, both a control channel and a data channel need to be considered.

A common and typical method for improving reliability of a downlink data channel is performing diversity transmission on downlink data, for example, time domain diversity, frequency diversity, and space diversity. However, using diversity transmission probably increases a latency or increases downlink resource indication signaling overheads. Therefore, how to improve downlink data transmission reliability without increasing a latency or a downlink control signaling bit becomes a problem that needs to be resolved.

SUMMARY

Embodiments of this application provide a downlink information transmission method and apparatus, and a device, so that downlink resource indication is implemented without increasing a latency and signaling overheads, and downlink data transmission reliability can be improved.

A first aspect of this application provides a downlink information transmission method, including:
encoding to-be-sent information bits into N transport blocks, where N>1;
determining a time-frequency resource used to send each transport block, where time-frequency resources occupied by at least two transport blocks include a same time domain resource and different frequency domain resources;
sending downlink resource indication information to user equipment, where the downlink resource indication information is used to indicate a time-frequency resource location of an $M^{th}$ transport block in the N transport blocks, and N≥M≥1; and
sending corresponding transport blocks on the determined time-frequency resources.

This solution is mainly used to indicate a downlink resource in a URLLC service process, so that downlink information transmission reliability is improved without increasing signaling overheads or a latency. A base station compiles the to-be-sent information into transport blocks. In this solution, there are at least two transport blocks. After the plurality of transport blocks are mapped to respective time-frequency resources, the downlink resource indication sent by the base station to the user equipment specifically indicates only a specific first time-frequency resource location of the $M^{th}$ transport block (which may be any transport block) sent by the base station, and a time-frequency resource location of another transport block is indicated by using a relationship between the time-frequency resource location and the time-frequency resource location of the $M^{th}$ transport block or is stipulated in the protocol or is notified to the user equipment by using higher layer signaling. In other words, the user equipment may pre-obtain a location parameter of the another transport block. After receiving the downlink resource indication, the user equipment determines a first time-frequency resource location of a first transport block sent by the base station, receives the first transport block in the first time-frequency resource location, and demodulates and decodes the first transport block. If the first transport block fails to be demodulated or decoded, the user equipment may determine the time-frequency resource location of the another transport block based on the time-frequency resource location of the $M^{th}$ transport block and the location parameter of the transport block, receive the transport block, and continue to demodulate and decode the transport block to obtain the information bits. In this solution, there is no need to indicate the time-frequency resource of each transport block for a plurality of times, so that signaling overheads are effectively reduced. In addition, the plurality of transport blocks all carry the to-be-sent information bits, and diversity transmission is performed in a downlink data region, thereby effectively improving transmission reliability.

In this solution, each of the N transport blocks carries the to-be-sent information, and each transport block can be independently decoded; or a first transport block in the N transport blocks carries the to-be-sent information, and the first transport block can be independently decoded; and a remaining transport block in the N transport blocks carries redundancy information or check information of the first transport block, and the remaining transport block and the first transport block can be jointly decoded.

Based on the foregoing solution, the time-frequency resource used to send each transport block is determined based on pre-determined available time-frequency resources, where a first to an $N^{th}$ of the N transport blocks are mapped to the available time-frequency resources in a sequence of "frequency domain first, time domain second".

In this solution, in a process of determining the specific time-frequency resource of each transport block, the base station first needs to obtain the available time-frequency resources and the quantity of to-be-sent transport blocks (the quantity of transport blocks is greater than 2). To reduce a transmission latency, the base station maps the transport blocks in the sequence of "frequency domain first, time domain second". In other words, the base station first maps the transport blocks in frequency domain, and after transport blocks are mapped to all available frequency domain resources, if there is still a transport block needing to be transmitted, the base station maps the transport block to a frequency domain resource in a next time domain location, so that an information bit transmission latency can be effectively reduced.

Optionally, the sending corresponding transport blocks on the determined time-frequency resources includes:

sending the transport blocks on the determined time-frequency resources in a chronological sequence in time domain until an acknowledgement message sent by the user equipment is received.

In this solution, the base station sends the transport blocks based on the pre-determined time-frequency resources, and no longer sends a remaining transport block if the base station receives an acknowledgement message returned by the user equipment, or continues to send a transport block in a chronological sequence if the base station does not receive an acknowledgement message.

Optionally, M=1, and the downlink resource indication information is used to indicate a time domain start location and/or a frequency domain start location of a time-frequency resource occupied by the first transport block.

Optionally, before the determining a time-frequency resource used to send each transport block, the method further includes:

obtaining unit time-frequency resource information occupied by each transport block, where the unit time-frequency resource information is used to indicate a size of a frequency domain resource occupied by the transport block and a size of a time domain resource occupied by the transport block.

In this solution, the first time-frequency resource location may directly indicate a time domain location and a frequency domain location of the first transport block. Optionally, the time domain start location or the frequency domain start location in which the first transport block is sent may alternatively be indicated in the foregoing manner, a specific time domain location and frequency domain location may be determined by using the unit time-frequency resource information occupied by each transport block, and the user equipment may receive the transport block in the corresponding location.

Optionally, M=1, and the downlink resource indication information is used to indicate a time domain start location and a time domain end location and/or a frequency domain start location and a frequency domain end location that are occupied by the first transport block.

Optionally, the downlink resource indication information further includes the quantity of transport blocks and/or a location parameter of a time-frequency resource of a transport block other than the $M^{th}$ transport block, and the location parameter of the transport block is used to indicate a relationship between a time-frequency resource location of the transport block and the time-frequency resource location of the $M^{th}$ transport block or is used to indicate a relationship between time-frequency resource locations of two neighboring transport blocks.

Optionally, the location parameter of the transport block includes a frequency domain interval between the transport block and the $M^{th}$ transport block or a frequency domain interval between two neighboring transport blocks.

In the foregoing solution, the relationship that is between the time-frequency resource location of the another transport block and the time-frequency resource location of the $M^{th}$ transport block and that is indicated in the location parameter of the transport block includes at least the foregoing two manners. In other words, the location parameter of the transport block indicates a frequency domain interval between a time-frequency resource location of each transport block and the time-frequency resource location of the $M^{th}$ transport block or indicates the frequency domain interval between two neighboring transport blocks. This solution is not limited to the foregoing two indication manners, and another indication manner may be used, provided that the time-frequency resource location of the another transport block can be determined based on the time-frequency resource location of the $M^{th}$ transport block.

A second aspect of this application provides an information transmission method, including:

receiving downlink resource indication information sent by a base station, where the downlink resource indication information indicates a time-frequency resource location of an $M^{th}$ transport block in N transport blocks sent by the base station, N>1, and N≥M≥1; and receiving, based on the downlink resource indication information, the transport blocks sent by the base station, and obtaining information based on the transport blocks.

In this solution, after receiving the downlink resource indication, the user equipment determines, based on the downlink resource indication information, a first time-frequency resource location of a first transport block sent by the base station, receives the first transport block based on the first time-frequency resource location, and demodulates and decodes the first transport block. If the first transport block fails to be demodulated or decoded, the user equipment may determine a time-frequency resource location of another transport block based on the time-frequency resource location of the $M^{th}$ transport block and an obtained location parameter of the another transport block, then receive the transport block, and continue to demodulate and decode the transport block. In this solution, there is no need to indicate a time-frequency resource of each transport block for a plurality of times, so that signaling overheads are effectively reduced. In addition, a plurality of transport blocks carry same information bits, and diversity transmission is performed in a downlink data region, thereby effectively improving transmission reliability.

Optionally, the downlink resource indication information further includes the quantity of transport blocks and/or a location parameter of a time-frequency resource of a transport block other than the $M^{th}$ transport block, and the location parameter of the transport block is used to indicate a relationship between a time-frequency resource location of the transport block and the time-frequency resource location of the $M^{th}$ transport block or is used to indicate a relationship between time-frequency resource locations of two neighboring transport blocks.

During specific implementation, M=1, the downlink resource indication information is used to indicate a first time-frequency resource location occupied by the first transport block, and the receiving, based on the downlink resource indication information, the transport blocks sent by the base station, and obtaining information based on the transport blocks includes:

receiving, in the first time-frequency resource location, the first transport block sent by the base station;

demodulating and decoding the first transport block;

if the first transport block fails to be demodulated or decoded, determining, based on the first time-frequency resource location and the pre-obtained location parameter corresponding to the another transport block, a time-frequency resource location corresponding to a next transport block sent by the base station, and obtaining the transport block that is received in the time-frequency resource location, where the location parameter is used to indicate a relationship between the time-frequency resource location of the transport block and the first time-frequency resource location or is used to indicate the relationship between the time-frequency resource locations of two neighboring transport blocks; and jointly demodulating and decoding the transport block and all previously received transport blocks, if the transport block and all the previously received transport blocks fail to be demodulated or decoded, determining, based on the first time-frequency resource location and the location parameter corresponding to the another transport block, a resource location corresponding to a next transport block, obtaining the transport block that is received in the time-frequency resource location, and repeating this step until a received transport block is successfully demodulated and decoded or all transport blocks sent by the base station are received.

In this solution, the user equipment receives the first transport block in the first time-frequency resource location, and demodulates and decodes the first transport block. If the first transport block is successfully demodulated and decoded, the user equipment does not perform subsequent processing, and does not need to receive a transport block that is not received. If the first transport block fails to be demodulated or decoded, the user equipment determines the time-frequency resource location of the next transport block based on the first time-frequency resource location and the location parameter of the another transport block, obtains the second transport block that is received in the location, and jointly decodes the received first transport block and the received second transport block. If the information bits are obtained, the user equipment does not perform subsequent processing. If the received first transport block and the received second transport block fail to be jointly decoded, the user equipment repeats the foregoing process until a received transport block is successfully demodulated and decoded or all transport blocks are received.

Optionally, before the receiving downlink resource indication information sent by a base station, the method further includes:

obtaining unit time-frequency resource information occupied by each transport block, where the unit time-frequency resource information is used to indicate a size of a frequency domain resource occupied by the transport block and a size of a time domain resource occupied by the transport block.

Optionally, the first time-frequency resource location includes a time domain start location and/or a frequency domain start location in which the first transport block is sent, and the determining, based on the first time-frequency resource location and the location parameter corresponding to the another transport block, a time-frequency resource location corresponding to a next transport block sent by the base station includes:

determining, based on the time domain start location and/or the frequency domain start location of the first transport block, the unit time-frequency resource information, and the location parameter corresponding to the another transport block, a time domain start location and/or a frequency domain start location that are/is occupied by the next transport block sent by the base station.

In this solution, the first time-frequency resource location may directly indicate a time domain location and a frequency domain location of the first transport block. Optionally, the time domain start location and/or the frequency domain start location in which the first transport block is sent may alternatively be indicated in the foregoing manner, a specific time domain location and frequency domain location may be determined by using the unit time-frequency resource information occupied by each transport block, and the user equipment may receive the transport block in the corresponding location.

Optionally, the first time-frequency resource location includes a time domain start location and a time domain end location and/or a frequency domain start location and a frequency domain end location of the first transport block; and the determining, based on the first time-frequency resource location and the location parameter corresponding to the another transport block, a time-frequency resource location corresponding to a next transport block sent by the base station includes:

determining, based on the location parameter corresponding to the another transport block and the time domain start location and the time domain end location of the first transport block, a time domain start location and a time domain end location that correspond to the next transport block sent by the base station; and/or determining, based on the location parameter corresponding to the another transport block, the frequency domain start location, and the frequency domain end location, a frequency domain start location and a frequency domain end location that correspond to the next transport block sent by the base station.

Optionally, M>1, and the receiving, based on the downlink resource indication information, the transport blocks sent by the base station, and obtaining information based on the transport blocks includes:

determining a first time-frequency resource location of a first transport block based on the time-frequency resource location of the $M^{th}$ transport block and the obtained location parameter of the time-frequency resource of the another transport block;

receiving, in the first time-frequency resource location, the first transport block sent by the base station;

demodulating and decoding the first transport block;

if the first transport block fails to be demodulated or decoded, determining, based on the time-frequency resource location of the $M^{th}$ transport block and the location parameter corresponding to the another transport block, a time-frequency resource location corresponding to a next transport block sent by the base station, and obtaining the transport block that is received in the time-frequency resource location, where the location parameter is used to indicate the relationship between the time-frequency resource location of the transport block and the time-frequency resource location of the $M^{th}$ transport block or is used to indicate the relationship between the time-frequency resource locations of two neighboring transport blocks; and jointly demodulating and decoding the transport block and all previously received transport blocks, if the transport block and all the previously received transport blocks fail to be demodulated or decoded, determining, based on the time-frequency resource location of the $M^{th}$ transport block and the location parameter corresponding to the another transport block, a resource location corresponding to a next transport block, obtaining the transport block that is received in the time-frequency resource location, and repeating this step until a received transport block is successfully demodulated and decoded or all transport blocks sent by the base station are received.

In this solution, when the downlink resource indication information does not indicate the resource location of the first transport block sent by the base station, the user equipment needs to determine the first time-frequency resource location of the first transport block based on the time-frequency resource location of the $M^{th}$ transport block and the obtained location parameter of the time-frequency resource of the another transport block, then sequentially receive the transport blocks according to the foregoing manner, and perform joint decoding processing on the transport blocks.

Optionally, the location parameter of the transport block includes a frequency domain interval between the transport block and the $M^{th}$ transport block or a frequency domain interval between two neighboring transport blocks.

In the foregoing solution, the relationship that is between the time-frequency resource location of the another transport block and the time-frequency resource location of the $M^{th}$ transport block and that is indicated in the location parameter of the transport block includes at least the foregoing two manners. In other words, the location parameter of the transport block indicates a frequency domain interval between a time-frequency resource location of each transport block and the time-frequency resource location of the $M^{th}$ transport block or indicates the frequency domain interval between two neighboring transport blocks. This solution is not limited to the foregoing two indication manners, and another indication manner may be used, provided that the time-frequency resource location of the another transport block can be determined based on the time-frequency resource location of the $M^{th}$ transport block.

Based on any one of the foregoing solutions, the method further includes:

sending an acknowledgement message to the base station if any transport block is successfully demodulated and decoded.

Optionally, the method further includes:

sending a failure message to the base station if all transport blocks sent by the base station fail to be jointly demodulated or decoded.

In this solution, the user equipment needs to provide feedback for downlink information sent by the base station, and return an acknowledgement message if demodulation and decoding succeed, or return a failure message if demodulation or decoding fails.

A third aspect of this application provides a downlink information transmission apparatus, including:

a processing module, configured to encode to-be-sent information into N transport blocks, where N>1, where the processing module is further configured to determine a time-frequency resource used to send each transport block, where time-frequency resources occupied by at least two transport blocks include a same time domain resource and different frequency domain resources; and a sending module, configured to send downlink resource indication information to user equipment, where the downlink resource indication information is used to indicate a time-frequency resource location of an $M^{th}$ transport block in the N transport blocks, and N≥M≥1, where the sending module is further configured to send corresponding transport blocks on the determined time-frequency resources.

Optionally, the processing module is specifically configured to determine, based on pre-determined available time-frequency resources, the time-frequency resource used to send each transport block, where a first to an $N^{th}$ of the N transport blocks are mapped to the available time-frequency resources in a sequence of "frequency domain first, time domain second".

Optionally, each of the N transport blocks obtained by the processing module through encoding carries the to-be-sent information, and each transport block can be independently decoded; or a first transport block in the N transport blocks obtained by the processing module through encoding carries the to-be-sent information, and the first transport block can be independently decoded; and a remaining transport block in the N transport blocks carries redundancy information or check information of the first transport block, and the remaining transport block and the first transport block can be jointly decoded.

Optionally, the apparatus further includes a receiving module; and the sending module is specifically configured to:

send the transport blocks on the determined time-frequency resources in a chronological sequence in time domain until the receiving module receives an acknowledgement message sent by the user equipment.

Optionally, M=1, and the downlink resource indication information sent by the sending module to the user equipment is used to indicate a time domain start location and/or a frequency domain start location of a time-frequency resource occupied by the first transport block.

Optionally, the processing module is further configured to: before determining the time-frequency resource used to send each transport block, obtain unit time-frequency resource information occupied by each transport block, where the unit time-frequency resource information is used to indicate a size of a frequency domain resource occupied by the transport block and a size of a time domain resource occupied by the transport block.

Optionally, M=1, and the downlink resource indication information sent by the sending module to the user equipment is used to indicate a time domain start location and a time domain end location and/or a frequency domain start location and a frequency domain end location that are occupied by the first transport block.

Optionally, the downlink resource indication information sent by the sending module to the user equipment further includes the quantity of transport blocks and/or a location parameter of a time-frequency resource of a transport block other than the $M^{th}$ transport block, and the location parameter of the transport block is used to indicate a relationship between a time-frequency resource location of the transport block and the time-frequency resource location of the $M^{th}$ transport block or is used to indicate a relationship between time-frequency resource locations of two neighboring transport blocks.

Optionally, the location parameter that is of the transport block and that is sent by the sending module to the user equipment includes a frequency domain interval between the transport block and the $M^{th}$ transport block or a frequency domain interval between two neighboring transport blocks.

A fourth aspect of this application provides an information transmission apparatus, including:

a receiving module, configured to receive downlink resource indication information sent by a base station, where the downlink resource indication information indicates a time-frequency resource location of an $M^{th}$ transport block in N transport blocks sent by the base station, N>1, and N≥M≥1, where the receiving module is further configured to receive, based on the downlink resource indication information, the transport blocks sent by the base station; and a processing module, configured to obtain information based on the transport blocks.

Optionally, the downlink resource indication information received by the receiving module further includes the quantity of transport blocks and/or a location parameter of a time-frequency resource of a transport block other than the $M^{th}$ transport block, and the location parameter of the transport block is used to indicate a relationship between a time-frequency resource location of the transport block and the time-frequency resource location of the $M^{th}$ transport block or is used to indicate a relationship between time-frequency resource locations of two neighboring transport blocks.

Optionally, M=1, the downlink resource indication information is used to indicate a first time-frequency resource location occupied by the first transport block, and the receiving module is specifically configured to receive, in the first time-frequency resource location, the first transport block sent by the base station;

the processing module is specifically configured to demodulate and decode the first transport block;

if the first transport block fails to be demodulated or decoded, the processing module is further configured to: determine, based on the time-frequency resource location of the $M^{th}$ transport block and the pre-obtained location parameter corresponding to another transport block, a time-frequency resource location corresponding to a next transport block sent by the base station, and obtain the transport block that is received in the time-frequency resource location, where the location parameter is used to indicate the relationship between the time-frequency resource location of the transport block and the time-frequency resource location of the $M^{th}$ transport block or is used to indicate the relationship between the time-frequency resource locations of two neighboring transport blocks; and the processing module is configured to jointly demodulate and decode the transport block and all previously received transport blocks, and if the transport block and all the previously received transport blocks fail to be demodulated or decoded, the processing module is further configured to: determine, based on the first time-frequency resource location and the location parameter corresponding to the another transport block, a resource location corresponding to a next transport block, obtain the transport block that is received in the time-frequency resource location, and repeat this step until a received transport block is successfully demodulated and decoded or all transport blocks sent by the base station are received.

Optionally, the processing module is further configured to obtain unit time-frequency resource information occupied by each transport block, where the unit time-frequency resource information is used to indicate a size of a frequency domain resource occupied by the transport block and a size of a time domain resource occupied by the transport block.

Optionally, the first time-frequency resource location includes a time domain start location and/or a frequency domain start location in which the first transport block is sent, and the processing module is specifically configured to determine, based on the time domain start location and/or the frequency domain start location of the first transport block, the unit time-frequency resource information, and the location parameter corresponding to the another transport block, a time domain start location and/or a frequency domain start location that are/is occupied by the next transport block sent by the base station.

Optionally, the first time-frequency resource location includes a time domain start location and a time domain end location and/or a frequency domain start location and a frequency domain end location of the first transport block; and the processing module is specifically configured to determine, based on the location parameter corresponding to the another transport block and the time domain start location and the time domain end location of the first transport block, a time domain start location and a time domain end location that correspond to the next transport block sent by the base station; and/or determine, based on the location parameter corresponding to the another transport block, the frequency domain start location, and the frequency domain end location, a frequency domain start location and a frequency domain end location that correspond to the next transport block sent by the base station.

Optionally, M>1, and the processing module is specifically configured to determine a first time-frequency resource location of a first transport block based on the time-frequency resource location of the $M^{th}$ transport block and the obtained location parameter of the time-frequency resource of the another transport block;

the receiving module is further configured to receive, in the first time-frequency resource location, the first transport block sent by the base station;

the processing module is further configured to demodulate and decode the first transport block;

if the first transport block fails to be demodulated or decoded, the processing module is further configured to: determine, based on the time-frequency resource location of the $M^{th}$ transport block and the location parameter corresponding to the another transport block, a time-frequency resource location corresponding to a next transport block sent by the base station, and obtain the transport block that is received in the time-frequency resource location, where the location parameter is used to indicate the relationship between the time-frequency resource location of the transport block and the time-frequency resource location of the $M^{th}$ transport block or is used to indicate the relationship between the time-frequency resource locations of two neighboring transport blocks; and the processing module is further configured to: jointly demodulate and decode the transport block and all previously received transport blocks, if the transport block and all the previously received transport blocks fail to be demodulated or decoded, determine, based on the time-frequency resource location of the $M^{th}$ transport block and the location parameter corresponding to the another transport block, a resource location corresponding to a next transport block, obtain the transport block that is received in the time-frequency resource location, and repeat this step until a received transport block is successfully demodulated and decoded or all transport blocks sent by the base station are received.

Optionally, the location parameter that is of the transport block and that is obtained by the processing module includes a frequency domain interval between the transport block and the $M^{th}$ transport block or a frequency domain interval between two neighboring transport blocks.

Optionally, the apparatus further includes:

a sending module, configured to send an acknowledgement message to the base station if the processing module successfully demodulates and decodes a transport block.

Optionally, the apparatus further includes:

a sending module, configured to send a failure message to the base station if the processing module fails to jointly demodulate or decode all transport blocks sent by the base station.

A fifth aspect of this application provides a base station, including:

a memory, configured to store information and a corresponding execution program;

a processor, configured to encode to-be-sent information bits into N transport blocks, where N>1, where the processor is further configured to determine a time-frequency resource used to send each transport block, where time-frequency resources occupied by at least two transport blocks include a same time domain resource and different frequency domain resources; and a transmitter, configured to send downlink resource indication information to user equipment, where the downlink resource indication information is used to indicate a time-frequency resource location of an $M^{th}$ transport block in the N transport blocks, and N≥M≥1, where the transmitter is further configured to send corresponding transport blocks on the determined time-frequency resources.

Optionally, the processor is specifically configured to determine, based on pre-determined available time-frequency resources, the time-frequency resource used to send each transport block, where a first to an $N^{th}$ of the N transport blocks are mapped to the available time-frequency resources in a sequence of "frequency domain first, time domain second".

Optionally, each of the N transport blocks obtained by the processor through encoding carries the to-be-sent information, and each transport block can be independently decoded; or a first transport block in the N transport blocks obtained by the processor through encoding carries the to-be-sent information, and the first transport block can be independently decoded; and a remaining transport block in the N transport blocks carries redundancy information or check information of the first transport block, and the remaining transport block and the first transport block can be jointly decoded.

Optionally, the base station further includes a receiver; and the transmitter is specifically configured to:

send the transport blocks on the determined time-frequency resources in a chronological sequence in time domain until the receiver receives an acknowledgement message sent by the user equipment.

Optionally, M=1, and the downlink resource indication information sent by the transmitter to the user equipment is used to indicate a time domain start location and/or a frequency domain start location of a time-frequency resource occupied by the first transport block.

Optionally, the processor is further configured to: before determining the time-frequency resource used to send each transport block, obtain unit time-frequency resource information occupied by each transport block, where the unit time-frequency resource information is used to indicate a size of a frequency domain resource occupied by the transport block and a size of a time domain resource occupied by the transport block.

Optionally, M=1, and the downlink resource indication information sent by the transmitter to the user equipment is used to indicate a time domain start location and a time domain end location and/or a frequency domain start location and a frequency domain end location that are occupied by the first transport block.

Optionally, the downlink resource indication information sent by the transmitter to the user equipment further includes the quantity of transport blocks and/or a location parameter of a time-frequency resource of a transport block other than the $M^{th}$ transport block, and the location parameter of the transport block is used to indicate a relationship between a time-frequency resource location of the transport block and the time-frequency resource location of the $M^{th}$ transport block or is used to indicate a relationship between time-frequency resource locations of two neighboring transport blocks.

Optionally, the location parameter that is of the transport block and that is sent by the transmitter to the user equipment includes a frequency domain interval between the transport block and the $M^{th}$ transport block or a frequency domain interval between two neighboring transport blocks.

A sixth aspect of this application provides user equipment, including:

a memory, configured to store a corresponding execution program;

a receiver, configured to receive downlink resource indication information sent by a base station, where the downlink resource indication information indicates a time-frequency resource location of an $M^{th}$ transport block in N transport blocks sent by the base station, N>1, and N≥M≥1, where the receiver is further configured to receive, based on the downlink resource indication information, the transport blocks sent by the base station; and a processor, configured to obtain information based on the transport blocks.

Optionally, the downlink resource indication information received by the receiver further includes the quantity of transport blocks and/or a location parameter of a time-frequency resource of a transport block other than the $M^{th}$ transport block, and the location parameter of the transport block is used to indicate a relationship between a time-frequency resource location of the transport block and the time-frequency resource location of the $M^{th}$ transport block or is used to indicate a relationship between time-frequency resource locations of two neighboring transport blocks.

Optionally, M=1, the downlink resource indication information is used to indicate a first time-frequency resource location occupied by the first transport block, and the receiver is specifically configured to receive, in the first time-frequency resource location, the first transport block sent by the base station;

the processor is specifically configured to demodulate and decode the first transport block;

if the first transport block fails to be demodulated or decoded, the processor is further configured to: determine, based on the first time-frequency resource location and the pre-obtained location parameter corresponding to another transport block, a time-frequency resource location corresponding to a next transport block sent by the base station, and obtain the transport block that is received in the time-frequency resource location, where the location parameter is used to indicate a relationship between the time-frequency resource location of the transport block and the first time-frequency resource location or is used to indicate the relationship between the time-frequency resource locations of two neighboring transport blocks; and the processor is configured to jointly demodulate and decode the transport block and all previously received transport blocks, and if the transport block and all the previously received transport blocks fail to be demodulated or decoded, the processor is further configured to: determine, based on the first time-frequency resource location and the location parameter corresponding to the another transport block, a resource location corresponding to a next transport block, obtain the transport block that is received in the time-frequency resource location, and repeat this step until a received transport block is successfully demodulated and decoded or all transport blocks sent by the base station are received.

Optionally, the processor is further configured to obtain unit time-frequency resource information occupied by each transport block, where the unit time-frequency resource information is used to indicate a size of a frequency domain resource occupied by the transport block and a size of a time domain resource occupied by the transport block.

Optionally, the first time-frequency resource location includes a time domain start location and/or a frequency domain start location in which the first transport block is sent, and the processor is specifically configured to determine, based on the time domain start location and/or the frequency domain start location of the first transport block, the unit time-frequency resource information, and the location parameter corresponding to the another transport block, a time domain start location and/or a frequency domain start location that are/is occupied by the next transport block sent by the base station.

Optionally, the first time-frequency resource location includes a time domain start location and a time domain end location and/or a frequency domain start location and a frequency domain end location of the first transport block; and the processor is specifically configured to determine, based on the location parameter corresponding to the another transport block and the time domain start location and the time domain end location of the first transport block, a time domain start location and a time domain end location that correspond to the next transport block sent by the base station;

and/or determine, based on the location parameter corresponding to the another transport block, the frequency domain start location, and the frequency domain end location, a frequency domain start location and a frequency domain end location that correspond to the next transport block sent by the base station.

Optionally, M>1, and the processor is specifically configured to determine a first time-frequency resource location of a first transport block based on the time-frequency resource location of the $M^{th}$ transport block and the obtained location parameter of the time-frequency resource of the another transport block;

the receiver is further configured to receive, in the first time-frequency resource location, the first transport block sent by the base station;

the processor is further configured to demodulate and decode the first transport block;

if the first transport block fails to be demodulated or decoded, the processor is further configured to: determine, based on the time-frequency resource location of the $M^{th}$ transport block and the location parameter corresponding to the another transport block, a time-frequency resource location corresponding to a next transport block sent by the base station, and obtain the transport block that is received in the time-frequency resource location, where the location parameter is used to indicate the relationship between the time-frequency resource location of the transport block and the time-frequency resource location of the $M^{th}$ transport block or is used to indicate the relationship between the time-frequency resource locations of two neighboring transport blocks; and the processor is further configured to: jointly demodulate and decode the transport block and all previously received transport blocks, if the transport block and all the previously received transport blocks fail to be demodulated or decoded, determine, based on the time-frequency resource location of the $M^{th}$ transport block and the location parameter corresponding to the another transport block, a resource location corresponding to a next transport block, obtain the transport block that is received in the time-frequency resource location, and repeat this step until a received transport block is successfully demodulated and decoded or all transport blocks sent by the base station are received.

Optionally, the location parameter that is of the transport block and that is obtained by the processor includes a frequency domain interval between the transport block and the $M^{th}$ transport block or a frequency domain interval between two neighboring transport blocks.

Optionally, the user equipment further includes:
a transmitter, configured to send an acknowledgement message to the base station if the processor successfully demodulates and decodes a transport block.

Optionally, the user equipment further includes:
a transmitter, configured to send a failure message to the base station if the processor fails to jointly demodulate or decode all transport blocks sent by the base station.

A seventh aspect of this application provides a storage medium, including a readable storage medium and a computer program, where the computer program is used to implement the downlink information transmission method provided in any implementation of the first aspect.

An eighth aspect of this application provides a storage medium, including a readable storage medium and a computer program, where the computer program is used to implement the downlink information transmission method provided in any implementation of the second aspect.

A ninth aspect of this application provides a program product. The program product includes a computer program (that is, an execution instruction), and the computer program is stored in a readable storage medium. At least one processor of a base station can read the computer program from the readable storage medium, and the at least one processor executes the computer program, so that the base station implements the downlink information transmission method provided in the implementations of the first aspect.

A tenth aspect of this application provides a program product. The program product includes a computer program (that is, an execution instruction), and the computer program is stored in a readable storage medium. At least one processor of user equipment can read the computer program from the readable storage medium, and the at least one processor executes the computer program, so that the user equipment implements the downlink information transmission method provided in the implementations of the second aspect.

In the downlink information transmission method and apparatus, and the device that are provided in this application, the base station encodes the to-be-sent information bits into the plurality of transport blocks, determines the time-frequency resource used to send each transport block, and sends the downlink resource indication information to the user equipment. The downlink resource indication information includes the first time-frequency resource location information corresponding to the $M^{th}$ transport block. The base station sends the corresponding transport blocks on the time-frequency resources. The user equipment receives the transport blocks based on the first time-frequency resource location and the pre-obtained location parameter of the another transport block, and decodes the transport blocks to obtain the information bits. The downlink resource indication information indicates a resource of only one transport block, so that the user equipment determines the time-frequency resource location of the another transport block based on the location parameter of the another transport block and the time-frequency resource location of the $M^{th}$ transport block, and there is no need to notify a time-frequency resource of each transport block, so that downlink control signaling overheads are effectively reduced. In this manner, downlink resource indication is implemented without increasing a latency or signaling overheads, and downlink data transmission reliability can be improved.

BRIEF DESCRIPTION OF DRAWINGS

FIG. 2A and FIG. 2B are a flowchart of Embodiment 2 of a downlink information transmission method according to this application;

DESCRIPTION OF EMBODIMENTS

Figure 1:
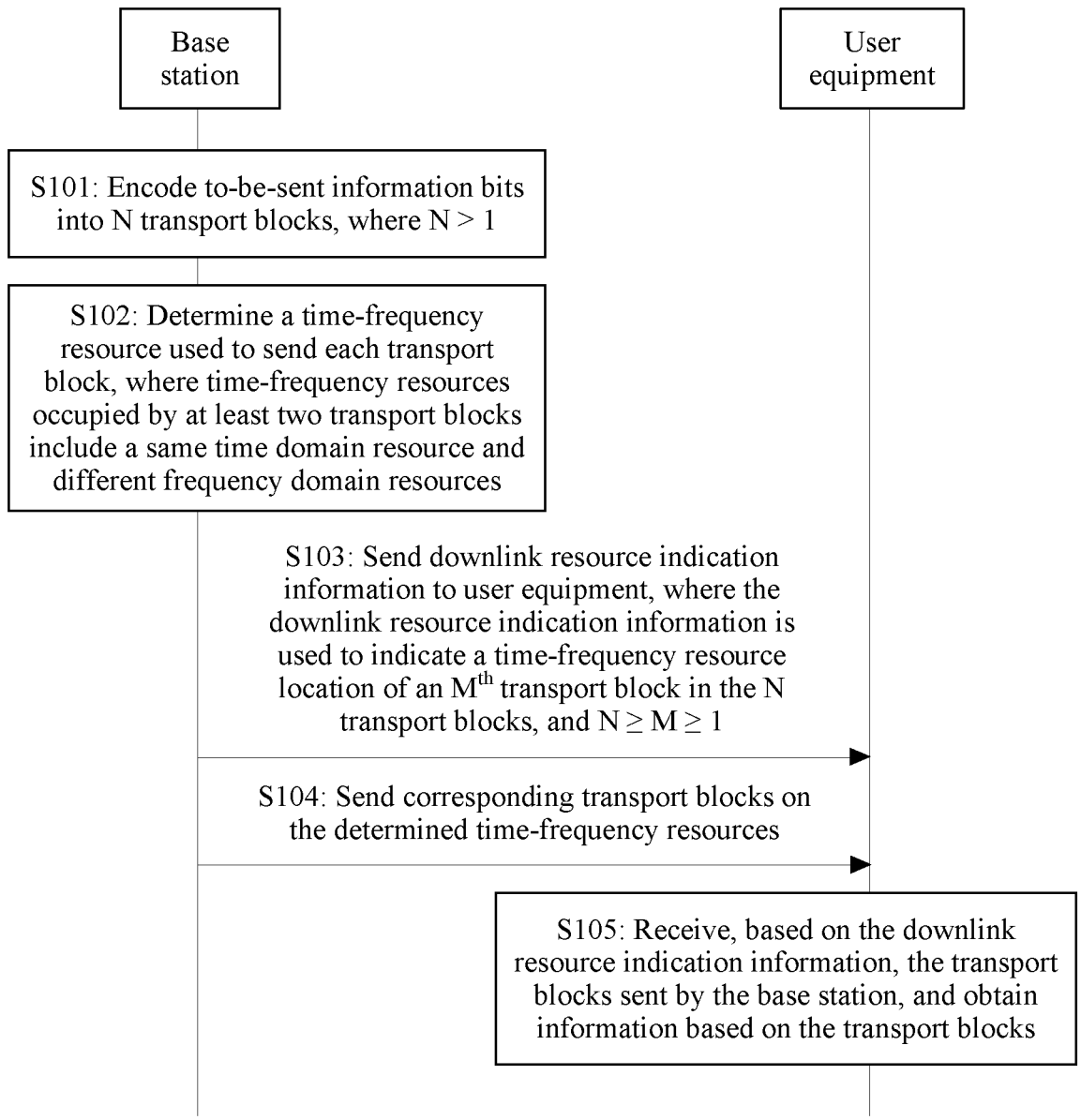
FIG. 1 is a flowchart of Embodiment 1 of a downlink information transmission method according to this application.

Compared with a 4G communications system, one feature of a 5G communications system is that a URLLC service is supported. There are a plurality of URLLC service types, and typical examples include industrial control, industrial production process automation, human computer interaction, telemedicine, and the like. To better quantize performance indices of a URLLC service to provide a reference input and evaluation criterion for designing the 5G system, the 3GPP RAN and RAN1 working groups define the following performance indices of the URLLC service.

A latency is a transmission time that is needed when a user application layer data packet reaches a radio protocol stack layer 2/3 service data unit (SDU) of a receive end from a radio protocol stack layer 2/3 SDU of a transmit end. Both an uplink user plane latency requirement and a downlink user plane latency requirement of a URLLC service are 0.5 ms, and the foregoing requirements are applicable only when neither a base station nor a terminal is in a discontinuous reception (DRX for short) state. It should be noted that the performance requirement of 0.5 ms means an average latency of a data packet, and is not bound to the following reliability requirement:

Reliability is a success probability that X bits are correctly transmitted from the transmit end to the receive end in a particular time (L seconds) under a given channel quality condition. The foregoing time is also defined as a time that is needed when a user application layer data packet reaches the radio protocol stack layer 2/3 SDU of the receive end from the radio protocol stack layer 2/3 SDU of the transmit end. For a URLLC service, a typical requirement is achieving reliability of 99.999% in 1 ms. It should be noted that the performance index is merely a typical value. Specifically, the URLLC service may have different reliability requirements. For example, some extremely hash industrial control requires a transmission success probability of 99.9999999% in an end-to-end latency of 0.25 ms.

A system capacity is a maximum cell throughput of a system when a particular percentage of user interruption is met. The user interruption means that the system cannot meet a reliability requirement of the URLLC service within a particular latency requirement.

The reliability performance index means overall reliability of the URLLC service. To meet this requirement, impact of all channels involved in transmission needs to be considered, that is, both a control channel and a data channel need to be considered.

A typical method for improving reliability of a downlink data channel is performing diversity transmission on downlink data, for example, time domain diversity, frequency diversity, and space diversity. However, using diversity transmission probably increases a latency or increases downlink resource indication signaling overheads. Therefore, how to improve downlink data transmission reliability without increasing a latency or a downlink control signaling bit becomes a problem that needs to be resolved.

This application provides a downlink resource indication method for a URLLC service, to improve downlink data transmission reliability without increasing a downlink data latency or signaling overheads. In this method, not only downlink data reliability can be improved, but also a latency can be minimized, and downlink control signaling overheads can be reduced. The following describes the downlink information transmission method in this application by using a specific implementation.

FIG. 1 is a flowchart of Embodiment 1 of a downlink information transmission method according to this application. As shown in FIG. 1, the solution is applied between a base station and user equipment. Specific implementation steps of the downlink information transmission method are as follows:

S101: Encode to-be-sent information bits into N transport blocks, where N>1.

In this step, the base station encodes the to-be-sent information (or the information bits) to obtain the plurality of transport blocks (N transport blocks). Each transport block carries the information bits, that is, all transport blocks include same content, and each transport block obtained by the base station through encoding can be independently demodulated and decoded (for example, a cyclic redundancy check (CRC) code may be added to each transport block).

Optionally, a first transport block in the N transport blocks carries the to-be-sent information, and the first transport block can be independently decoded; and a remaining transport block in the N transport blocks carries redundancy information or check information of the first transport block, and the remaining transport block and the first transport block can be jointly decoded. Content of another transport block is obtained by analogy.

In this solution, there are at least two transport blocks.

S102: Determine a time-frequency resource used to send each transport block, where time-frequency resources occupied by at least two transport blocks include a same time domain resource and different frequency domain resources.

The base station obtains available time-frequency resources, and maps the plurality of transport blocks to corresponding resources, to obtain the time-frequency resource used for downlink transmission of each transport block. In the mapping process, a frequency domain resource multiplexing manner is used for at least two transport blocks.

Optionally, a specific determining manner may be: determining, based on the pre-determined available time-frequency resources, the time-frequency resource used to send each transport block, where a first to an $N^{th}$ of the N transport blocks are mapped to the available time-frequency resources in a sequence of "frequency domain first, time domain second". This means that the transport blocks are mapped to the available time-frequency resources in the sequence of "frequency domain first, time domain second", to reduce a transmission latency.

S103: Send downlink resource indication information to the user equipment, where the downlink resource indication information is used to indicate a time-frequency resource location of an $M^{th}$ transport block in the N transport blocks, and N≥M≥1.

In this step, after obtaining the time-frequency resource of each transport block, the base station adds a time domain resource location and a frequency domain resource location of the $M^{th}$ transport block (which may be any transport block) to the downlink resource indication information, and sends the downlink resource indication information to the user equipment. A time-frequency resource of the another transport block is not specifically indicated. The user equipment may determine a time-frequency resource location of the another transport block based on a time-frequency resource mapping rule stipulated in the protocol, a location parameter that is of the another transport block and that is notified by using higher layer signaling, or a location parameter that is of the another transport block and that is carried in the downlink resource indication.

Optionally, the downlink resource indication information further includes the quantity of transport blocks and/or the location parameter of the time-frequency resource of a transport block other than the transport block corresponding to the first time-frequency resource location, and the location parameter of the transport block is used to indicate a relationship between a time-frequency resource location of the transport block and the first time-frequency resource location or is used to indicate a relationship between time-frequency resource locations of two neighboring transport blocks.

This means that a location parameter of a transport block is used to indicate a relationship between a time-frequency resource of the transport block and the first time-frequency resource location or is used to indicate a relationship between time-frequency resources of two neighboring transport blocks, so that the time-frequency resource of the transport block can be determined based on the first time-frequency resource location and the location parameter.

After sending the downlink resource indication information to the user equipment, the base station sends the transport blocks on the respective time-frequency resources, so that the user equipment obtains the information bits carried in the transport blocks.

S104: Send corresponding transport blocks on the determined time-frequency resources.

The base station sends the transport blocks on the determined time-frequency resources, and sends the transport blocks by using the determined time-frequency resources in a chronological sequence of time domain until an acknowledgement message sent by the user equipment is received.

In this solution, a same frequency resource may be multiplexed in time domain, that is, the plurality of transport blocks are sent in different frequency resources.

S105: Receive, based on the downlink resource indication information, the transport blocks sent by the base station, and obtain the information based on the transport blocks.

In this step, the user equipment needs to determine the time-frequency resource locations of the transport blocks based on the downlink resource indication information, receives the transport blocks in the determined time-frequency resource locations, and demodulates and decodes the transport blocks, to obtain the information bits.

Specifically, for example, the downlink resource indication information indicates the first time-frequency resource location of the first transport block sent by the base station. The user equipment receives the first transport block in the first time-frequency resource location, and demodulates and decodes the first transport block. If the first transport block is successfully demodulated and decoded, the user equipment does not perform subsequent processing, and does not need to receive the another transport block. If the first transport block fails to be demodulated and decoded, the user equipment determines a time-frequency resource location of a next transport block based on the first time-frequency resource location and the location parameter of the another transport block, and receives the second transport block in the location. The user equipment jointly decodes the received first transport block and the received second transport block. If the received first transport block and the received second transport block are successfully demodulated and decoded, the user equipment does not perform subsequent processing. If the received first transport block and the received second transport block fail to be demodulated or decoded, the user equipment repeats the foregoing process until all transport blocks are received or demodulation and decoding succeed.

If the downlink resource indication information indicates the time-frequency resource location of the $M^{th}$ transport block (M>1) sent by the base station, the user equipment first needs to determine the first time-frequency resource location of the first transport block based on the location parameter of the transport block (the location parameter is used to indicate the relationship between the time-frequency resource location of the transport block and the time-frequency resource location of the $M^{th}$ transport block or is used to indicate the relationship between the time-frequency resource locations of two neighboring transport blocks) and the time-frequency resource location of the $M^{th}$ transport block, then obtains the transport block that is received in the first time-frequency resource location, and decodes the transport block. If the transport block fails to be decoded, the user equipment obtains a time-frequency resource location of a next transport block based on the time-frequency resource location of the M$^{th}$ transport block and the location parameter of the another transport block, and continues to receive the transport block for joint decoding, to receive and decode a transport block by analogy.

In the downlink information transmission method provided in this solution, the downlink resource indication sent by the base station to the user equipment specifically indicates only the time-frequency resource location of the M$^{th}$ transport block sent by the base station. After receiving the downlink resource indication, the user equipment may determine the first time-frequency resource location of the first transport block based on the time-frequency resource location of the M$^{th}$ transport block, receive the first transport block, and demodulate and decode the first transport block. If the first transport block fails to be demodulated or decoded, the user equipment may determine the time-frequency resource location of the another transport block based on the time-frequency resource location of the M$^{th}$ transport block and the pre-obtained location parameter of the another transport block, and receive the transport block for demodulation and decoding. Therefore, there is no need to indicate a time-frequency resource of each transport block for a plurality of times, so that signaling overheads are effectively reduced. In addition, a plurality of transport blocks carry same information bits, and diversity transmission is performed on the plurality of transport blocks in a downlink data region, thereby effectively improving transmission reliability.

Based on the embodiment shown in FIG. 1, the following provides a specific implementation. In this implementation, for example, each transport block carries same information and can be independently decoded, and M=1.

Figure 2A:
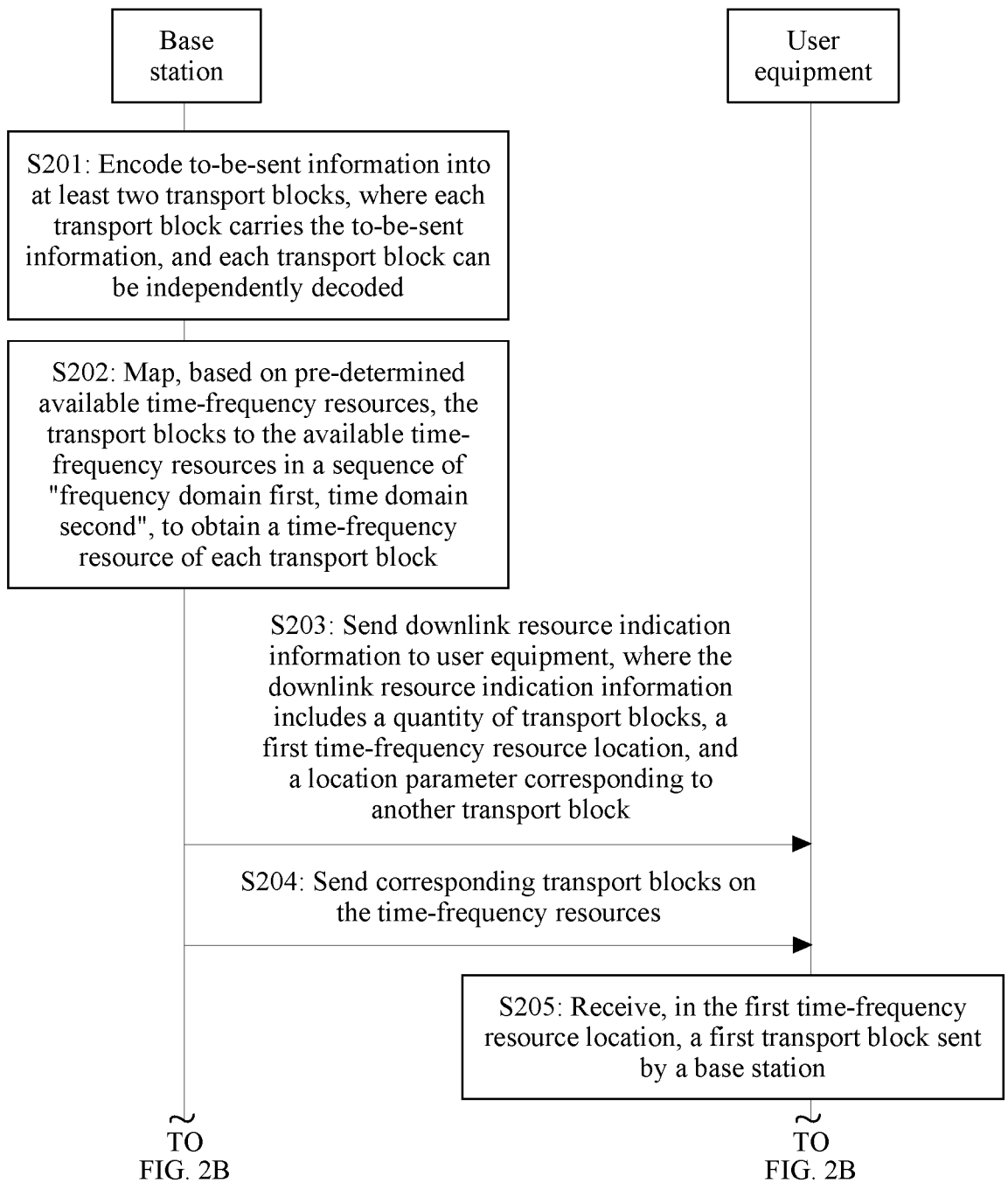

FIG. 2A and FIG. 2B are a flowchart of Embodiment 2 of a downlink information transmission method according to this application. As shown in FIG. 2A and FIG. 2B, the downlink information transmission methods include the following specific implementation steps.

S201: Encode to-be-sent information into at least two transport blocks, where each transport block carries the to-be-sent information, and each transport block can be independently decoded.

This step is similar to step S101. In a specific implementation, to-be-sent information bits may be encoded into N transport blocks (N is greater than or equal to 2), and CRC is added to each transport block, to implement independent decoding.

S202: Map, based on pre-determined available time-frequency resources, the transport blocks to the available time-frequency resources in a sequence of "frequency domain first, time domain second", to obtain a time-frequency resource of each transport block.

In this step, a base station determines, based on the pre-determined available time-frequency resources, the time-frequency resource used to send each transport block, where a first to an N$^{th}$ of the N transport blocks are mapped to the available time-frequency resources in the sequence of "frequency domain first, time domain second".

This means that in a process of determining the specific time-frequency resource of each transport block, the base station first needs to obtain the available time-frequency resources and the quantity of to-be-sent transport blocks (the quantity of transport blocks is greater than 2). To reduce a transmission latency, the base station maps the transport blocks in the sequence of "frequency domain first, time domain second". In other words, the base station first map the transport blocks in frequency domain, and after transport blocks are mapped to all available frequency domain resources, if there is still a transport block needing to be transmitted, the base station maps the transport block to a frequency domain resource in a next time domain location, so that an information bit transmission latency can be effectively reduced.

If the base station obtains the time-frequency resource of each transport block according to the foregoing mapping manner, the base station may determine a relationship between the time-frequency resources corresponding to the transport blocks, and the base station may obtain a time-frequency resource parameter based on this.

Optionally, before this step, the base station obtains unit time-frequency resource information occupied by each transport block, where the unit time-frequency resource information is used to indicate a size of a frequency domain resource occupied by the transport block and a size of a time domain resource occupied by the transport block. The base station or user equipment may determine, based on a size of each transport block, a frequency domain resource and/or a time domain resource that are/is occupied by the transport block.

S203: Send downlink resource indication information to user equipment, where the downlink resource indication information includes a quantity of transport blocks, a first time-frequency resource location, and a location parameter corresponding to another transport block.

In this solution, M=1, and that the downlink resource indication information is used to indicate a time-frequency resource occupied by a first transport block may be specifically that the downlink resource indication information directly carries the first time-frequency resource location.

In a specific implementation, the first time-frequency resource location includes a time domain start location and/or a frequency domain start location of the time-frequency resource occupied by the first transport block.

This means that the first time-frequency resource location may directly indicate a time domain location range and/or a frequency domain location range of the first transport block. Optionally, when a frequency domain location of the first transport block is fixed, the time domain start location of the first transport block may alternatively be indicated in the foregoing manner. Likewise, when a time domain location of the first transport block is fixed, the frequency domain start location of the first transport block may alternatively be indicated in the foregoing manner. Then, the specific time domain location range and frequency domain location range may be determined by using the unit time-frequency resource information occupied by each transport block. After receiving the downlink resource indication information, the user equipment determines the time-frequency resource location of the first transport block, and receives the transport block in the corresponding location.

Optionally, the first time-frequency resource location includes a time domain start location and a time domain end location and/or a frequency domain start location and a frequency domain end location of the first transport block sent by the base station. In other words, the downlink resource indication information is used to indicate the time domain start location and the time domain end location and/or the frequency domain start location and the frequency domain end location that are occupied by the first transport block.

The meaning of this solution is that the first time-frequency resource location directly indicates the time domain start location, the time domain end location, the frequency domain start location, and the frequency domain end location of the first transport block. Optionally, when a frequency domain location of the first transport block is fixed, the time domain start location and the time domain end location of the first transport block may alternatively be indicated in the foregoing manner. Likewise, when a time domain location of the first transport block is fixed, the frequency domain start location and the frequency domain end location of the first transport block may alternatively be indicated in the foregoing manner. In other words, the start location and the end location of the first transport block are clearly indicated, and the time-frequency resource location of the transport block can be obtained without obtaining the unit time-frequency resource information occupied by each transport block.

In addition, in this solution, a location parameter of the transport block may be carried in the downlink resource indication, and notified to the user equipment, or may be configured by using higher layer signaling, or may be stipulated in the protocol.

The location parameter of the transport block includes a frequency domain interval between the transport block and an $M^{th}$ transport block or a frequency domain interval between two neighboring transport blocks. In the foregoing solution, the relationship that is between a time-frequency resource location of the another transport block and a time-frequency resource location of the $M^{th}$ transport block and that is indicated in the time-frequency resource parameter of the transport block includes at least the foregoing two manners. In other words, the location parameter of the transport block indicates a frequency domain interval between a time-frequency resource location of each transport block and the time-frequency resource location of the $M^{th}$ transport block or indicates the frequency domain interval between two neighboring transport blocks.

This solution is not limited to the foregoing two indication manners, and another indication manner may be used, provided that the time-frequency resource location of the another transport block can be determined based on the time-frequency resource location of the $M^{th}$ transport block.

S204: Send the corresponding transport blocks on the time-frequency resources.

After sending the downlink resource indication information to the user equipment, the base station sends the at least two transport blocks that are mapped to the corresponding time-frequency resources. After sending a corresponding transport block on at least one time-frequency resource, in a process of sending a remaining transport block, the base station constantly receives feedback information from the user equipment, and the base station determines, based on the feedback information, whether to send the remaining transport block.

During specific implementation, the base station sends the first transport block in the first time-frequency resource location. If there is only one transport block in a time domain location in the first time-frequency resource location, only one transport block is sent. If there are a plurality of transport blocks in a plurality of frequency domain resources corresponding to the time domain location in the first time-frequency resource location, the plurality of transport blocks on the plurality of frequency resources are all sent in the time domain location.

If the user equipment receives the transport block and successfully decodes the transport block to obtain the information bits, the user equipment returns an acknowledgement message. In other words, the base station receives the acknowledgement message that indicates successful receiving and that is sent by the user equipment, and the base station no longer continues to send the another transport block. If the base station does not receive the acknowledgement message returned by the user equipment, the base station needs to continue to send the transport block, that is, send the corresponding transport block in a remaining time-frequency resource location in a chronological sequence of time domain until the acknowledgement message returned by the user equipment is received.

S205: Receive, in the first time-frequency resource location, a first transport block sent by the base station.

S206: Demodulate and decode the first transport block.

S207: If the first transport block fails to be demodulated or decoded, determine, based on the first time-frequency resource location and the location parameter corresponding to the another transport block, a time-frequency resource location corresponding to a next transport block sent by the base station, and obtain the transport block that is received in the time-frequency resource location.

S208: Jointly demodulate and decode the transport block and all previously received transport blocks, if the transport block and all the previously received transport blocks fail to be demodulated or decoded, determine, based on the first time-frequency resource location and the location parameter corresponding to the another transport block, a resource location corresponding to a next transport block, obtain the transport block that is received in the time-frequency resource location, and repeat this step until a received transport block is successfully demodulated and decoded or all transport blocks sent by the base station are received.

In the foregoing several steps, the user equipment first receives, in the first time-frequency resource location, the first transport block that is sent by the base station to the user equipment, and then demodulates and decodes the received first transport block. If the first transport block is successfully demodulated and decoded, the user equipment returns the acknowledgement message to the base station, and the user equipment does not need to obtain a resource of a subsequent transport block that is not received, and does not need to receive the transport block that is not received.

If the first transport block fails to be demodulated or decoded, the user equipment determines a time-frequency resource location of a next transport block (that is, a second transport block) based on the first time-frequency resource location and the location parameter of the another transport block, then receives, in the time-frequency resource location, the second transport block sent by the base station, and then performs joint decoding processing on the first transport block and the second transport block. If the first transport block and the second transport block are successfully demodulated and decoded, the user equipment returns the acknowledgement message to the base station, and the process ends. If the first transport block and the second transport block fail to be demodulated or decoded, the user equipment determines a time-frequency resource location of a next transport block based on the location parameter, receives the next transport block, and jointly demodulates and decodes all received transport blocks. In other words, the process is repeated until demodulation and decoding succeed, or the process ends after all transport blocks are received but fail to be demodulated or decoded.

In a process of implementing steps S205 to S208, the first time-frequency resource location includes the time domain start location and/or the frequency domain start location in which the first transport block is sent, and the user equipment needs to pre-obtain the unit time-frequency resource information occupied by each transport block. The unit time-frequency resource information is used to indicate the size of the frequency domain resource occupied by the transport block and the size of the time domain resource occupied by the transport block. A manner of determining the time-frequency resource location of the next transport block in S207 is: determining, based on the time domain start location and the frequency domain start location of the first transport block, the unit time-frequency resource information, and the location parameter corresponding to the another transport block, a time domain start location and/or a frequency domain start location that are/is occupied by the next transport block sent by the base station.

Optionally, the first time-frequency resource location includes the time domain start location and the time domain end location and/or the frequency domain start location and the frequency domain end location of the first transport block, and an implementation of determining the time-frequency resource location corresponding to the next transport block sent by the base station in S207 is: determining, based on the location parameter corresponding to the another transport block and the time domain start location and the time domain end location of the first transport block, a time domain start location and a time domain end location that correspond to the next transport block sent by the base station;

and/or determining, based on the location parameter corresponding to the another transport block, the frequency domain start location, and the frequency domain end location, a frequency domain start location and a frequency domain end location that correspond to the next transport block sent by the base station.

During specific implementation of the foregoing two manners, the frequency domain start location and the frequency domain end location may be specifically identified by using numbers. For example, the available time-frequency resources may be numbered by using virtual numbers. A numbering method is: numbering frequency domain resources from a first available time domain resource in ascending sequence of frequency domain, and after all frequency domain resources in one time domain resource are numbered, numbering frequency domain resources in a next time domain resource in ascending sequence, where numbers are positive integers in ascending sequence. The first time-frequency resource location may be directly represented by using a start number and an end number, and generally, a start number of a frequency domain resource of the first transport block is the smallest. A relationship between a time-frequency resource of the another transport block and the time-frequency resource of the first transport block may alternatively be represented by using a number difference, and this is not specifically limited in this application.

S209: Send an acknowledgement message to the base station if a transport block is successfully demodulated and decoded.

S210: Send a failure message to the base station if all transport blocks sent by the base station fail to be jointly demodulated or decoded.

Only one of steps S209 and S210 is performed. If the user equipment successfully performs demodulation and decoding, the user equipment returns the acknowledgement message to the base station, and notifies the base station that the information is successfully received; if the user equipment fails in demodulation or decoding, the user equipment feeds back the failure message to the base station, so that the base station can re-send a transport block or perform corresponding processing.

Optionally, M>1, and before step S205, the user equipment determines the first time-frequency resource location of the first transport block based on the time-frequency resource location of the $M^{th}$ transport block and the obtained location parameter of the time-frequency resource of the another transport block, and then receives the first transport block, and decodes the first transport block. If the first transport block fails to be decoded, the user equipment determines the time-frequency resource location of the second transport block based on the time-frequency resource location of the $M^{th}$ transport block and the location parameter of the another transport block, and so on, to implement information transmission.

Based on the descriptions of S201 to S210, during specific implementation of this solution, a time-frequency resource is a resource including one subframe in time domain and full available downlink bandwidth in frequency domain.

The time-frequency resource may be divided into $N_t \times N_f$ grids. In other words, a length of one subframe is evenly divided into $N_t$ slots on a time axis and evenly divided into $N_f$ grids on a frequency axis, and each grid represents one RB. The RB lasts for one slot in time domain, and occupies a plurality of subcarriers in frequency domain. For example, in LTE, one RB occupies one slot and lasts for 0.5 ms in time domain, and occupies 12 subcarriers (when a subcarrier spacing is 15 kHz) or 24 subcarriers (when a subcarrier spacing is 7.5 kHz) in frequency domain. Based on this, a specific implementation of the downlink information transmission scheme is:

First, the base station sends downlink resource indication information to the user equipment. The downlink resource indication information includes a quantity N of downlink data channel transport blocks sent by the base station to the user equipment, a time-frequency resource location of a first transport block, and location parameters of time-frequency resources of N−1 remaining downlink transport blocks.

The base station scrambles a cyclic redundancy check (CRC for short) code by using an identifier (that is, a terminal identifier) of user equipment needing to be scheduled, adds the CRC code to resource indication information, performs encoding, rate matching, scrambling, modulation, and interleaving, maps the resource indication information to a downlink control region, and sends the resource indication information to the user equipment.

Second, the base station sends downlink data information to the user equipment in the downlink data region based on the downlink resource indication information, that is, sends the plurality of transport blocks on respective time-frequency resources.

In this step, the base station first encodes original information bits into N transport blocks that can be independently decoded, where a size of a transport block is S. The base station maps one transport block to a location $(i_1, j_1)$ of the first transport block in the resource indication.

The base station maps the N−1 transport blocks to the corresponding time-frequency resource locations based on the location parameters of the time-frequency resources of the N−1 remaining downlink transport blocks. A specific mapping process is as follows:

In a first example, the location parameters of the time-frequency resources of the N−1 remaining downlink transport blocks are a frequency domain interval G (G indicates a quantity of RBs between an end location of a previous transport block and a start location of a current transport block) between two neighboring transport blocks. In this case, the N−1 remaining transport blocks are mapped to the time-frequency resources in a sequence of "frequency domain first, time domain second" based on the start location $(i_1, j_1)$ of the first transport block and the frequency domain interval G between two neighboring transport blocks. A location $(i_k, j_k)$ of a $k(k≥2)^{th}$ transport block may be uniquely determined according to the following formula:

$$\begin{cases} i_k = i_{k-1} + 1 \\ j_k = j_{k-1} + S + G - N_f \end{cases}, \text{if } (j_{k-1} + S + G) > N_f, \text{ or}$$

$$\begin{cases} i_k = i_{k-1} \\ j_k = j_{k-1} + S + G \end{cases}, \text{if } (j_{k-1} + S + G) \le N_f.$$

Figure 3:
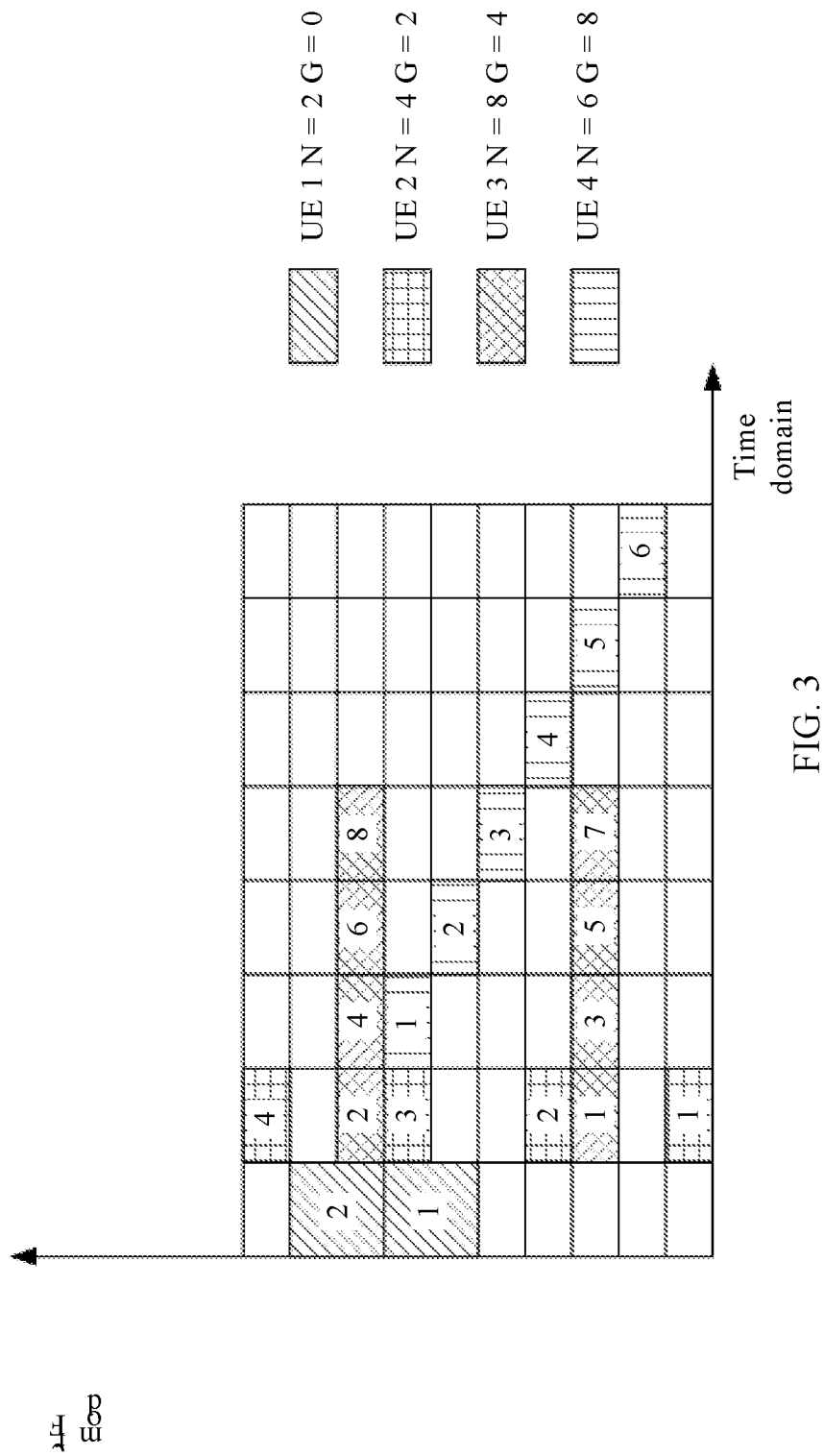
FIG. 3 is a schematic diagram of specifically mapping transport blocks in a downlink data region according to this application.

For example, FIG. 3 is a specific schematic diagram of mapping transport blocks to a downlink data region according to this application. As shown in FIG. 3, it is assumed that the base station schedules four user equipments UE 1 to UE 4 in one subframe, and given resource indication information of the user equipments according to step 1 is shown in the following table:

| User equipment | N | $(i_1, j_1)$ | G | Size S of a transport block (specified in other downlink control information) |
|---|---|---|---|---|
| UE 1 | 2 | (1, 6) | 0 | 2 |
| UE 2 | 4 | (2, 1) | 2 | 1 |
| UE 3 | 8 | (2, 3) | 4 | 1 |
| UE 4 | 6 | (3, 7) | 8 | 1 |

Then, a result of mapping, into to the downlink data region, the downlink data transport blocks sent by the base station to the user equipment is shown in FIG. 3.

In a second example, the location parameters of the time-frequency resources of the N−1 remaining downlink transport blocks each are a quantity X of transport blocks in each slot, and a frequency interval G between neighboring transport blocks in each scheduling period is configured by using a higher layer.

The total quantity N of transport blocks may be represented as $N = X \times T_N + L_N$, where $0 \le L_N < X$. It indicates that X transport blocks are transmitted in each scheduling period in $T_N$ scheduling periods starting from the first transport block, and $L_N$ transport blocks are transmitted in a $T_N + 1_{th}$ scheduling period.

The N−1 remaining downlink transport blocks are mapped to the time-frequency resources in the sequence of "frequency domain first, time domain second" based on the start location $(i_1, j_1)$ of the first transport block and the quantity X of transport transmitted in each scheduling period. A location $(i_k, j_k)$ of a $k(k≥2)^{th}$ transport lock may be uniquely determined according to the following formula:

$$\text{if } L_k > 0, \begin{cases} i_k = i_1 + T_k \\ j_k = \begin{cases} j_{k-1} + S + G - N_f, \text{if } (j_{k-1} + S + G) > N_f \\ j_{k-1} + S + G, \text{if } (j_{k-1} + S + G) \le N_f \end{cases} \end{cases}; \text{or}$$

$$\text{if } L_k = 0, \begin{cases} i_k = i_1 + T_k - 1 \\ j_k = \begin{cases} j_{k-1} + S + G - N_f, \text{if } (j_{k-1} + S + G) > N_f \\ j_{k-1} + S + G, \text{if } (j_{k-1} + S + G) \le N_f \end{cases} \end{cases}.$$

Figure 4:
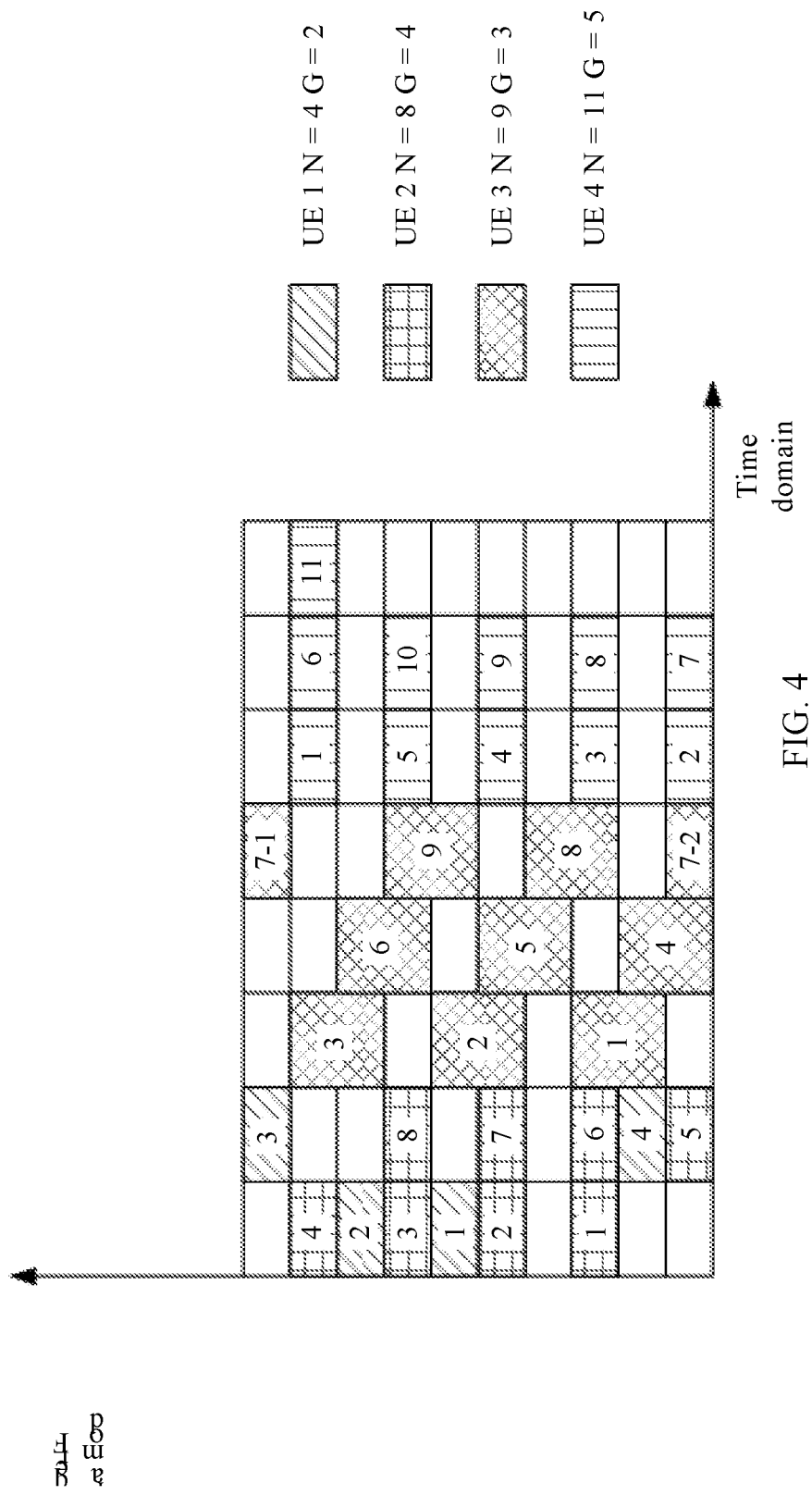
FIG. 4 is another schematic diagram of specifically mapping transport blocks in a downlink data region according to this application.

FIG. 4 is a specific schematic diagram of mapping transport blocks to a downlink data region according to this application. As shown in FIG. 4, it is assumed that the base station schedules four user equipments UE 1 to UE 4 in 1 ms, and given resource indication information of the user equipments according to step 1 is shown the following table:

| User equipment | N | $(i_1, j_1)$ | X | G (higher layer configuration) | Size S of a transport block (specified in other downlink control information) |
|---|---|---|---|---|---|
| UE 1 | 4 | (1, 6) | 2 | 1 | 1 |
| UE 2 | 8 | (1, 3) | 4 | 1 | 1 |
| UE 3 | 9 | (3, 2) | 3 | 1 | 2 |
| UE 4 | 11 | (6, 9) | 5 | 1 | 1 |

Then, a result of mapping, into the downlink data region, the downlink data transport blocks sent by the base station to the user equipment is shown in FIG. 4.

It should be noted that the location parameters of the time-frequency resources of the N−1 remaining downlink transport blocks each may be the frequency domain interval G between two neighboring transport blocks in the first example or the quantity X of transport blocks in each scheduling period in the second example, or may be another parameter. Which parameter is specifically selected is stipulated in the standard. If it is stipulated in the standard that a plurality of parameters may be used at the same time, indication information is added to the downlink resource indication information to indicate which parameter is used as each of the location parameters of the time-frequency resources of the N−1 remaining downlink transport blocks. Further, the base station sends mapped data information to the user equipment.

Further, the user equipment receives the downlink resource indication information. In this step, the user equipment performs blind detection on downlink control information in search space of the user equipment.

If the user equipment detects downlink resource allocation information, the user equipment obtains the downlink resource indication information. The downlink resource indication information includes the quantity N of data channel transport blocks, the location information $(i_1, j_1)$ of the time-frequency resource of the first transport block, and the location parameters of the time-frequency resources of the N−1 remaining downlink transport blocks.

If the user equipment does not detect the downlink resource allocation information, it indicates that the user equipment is not scheduled, and the user equipment does not need to receive any data information.

Finally, the user equipment receives the transport block in the downlink data region.

In this step, the user equipment first finds the first transport block based on the downlink resource indication information that is received in the foregoing solution, and then the user equipment demodulates and decodes the first transport block, including:

if the first transport block is successfully decoded, the user equipment does not process the subsequent N−1 transport blocks, feeds back ACK information to the base station, and ends current communication; or if the first transport block fails to be decoded, the user equipment searches for the second transport block based on the location $(i_1, j_1)$ of the time-frequency resource of the first transport block and the location parameters of the time-frequency resources of the N−1 remaining downlink transport blocks.

If it is stipulated in the standard that or downlink indication information indicates that the frequency domain interval G between two neighboring transport blocks is used as each of the location parameters of the time-frequency resources of the N−1 remaining downlink transport blocks, the second transport block is found based on the following formula:

$$\begin{cases} i_2 = i_1 + 1 \\ j_2 = j_1 + S + G - N_f \end{cases}, \text{if } (j_1 + S + G) > N_f \text{ or}$$

$$\begin{cases} i_2 = i_1 \\ j_2 = j_1 + S + G \end{cases}, \text{if } (j_1 + S + G) \leq N_f.$$

If it is stipulated that or downlink indication information indicates that the quantity X of transport blocks transmitted in each scheduling interval is used as each of the location parameters of the time-frequency resources of the N−1 remaining downlink transport blocks, the second transport block is found based on the following formula:

$$\text{if } X \geq 2, \begin{cases} i_2 = i_1 \\ j_2 = \begin{cases} j_1 + S + G - N_f, \text{if } (j_1 + S + G) > N_f \\ j_1 + S + G, \text{if } (j_1 + S + G) \leq N_f \end{cases} \end{cases} ; \text{or}$$

$$\text{if } X < 2, \begin{cases} i_2 = i_1 + 1 \\ j_2 = \begin{cases} j_1 + S + G - N_f, \text{if } (j_1 + S + G) > N_f \\ j_1 + S + G, \text{if } (j_1 + S + G) \leq N_f \end{cases} \end{cases}.$$

If it is stipulated in the standard that or downlink indication information indicates that another parameter is used as each of the location parameters of the time-frequency resources of the N−1 remaining downlink transport blocks, the second transport block is found based on the location $(i_1, j_1)$ of the time-frequency resource of the first transport block and the location parameters of the time-frequency resources of the N−1 remaining downlink transport blocks and according to a pre-defined mapping rule of "frequency domain first, time frequency second".

Then, the user equipment jointly decodes the first transport block and the second transport block, including:

if the first transport block and the second transport block are successfully decoded jointly, the user equipment does not process subsequent N−2 transport blocks, feeds back ACK information to the base station, and ends current communication; or if the first transport block and the second transport block fail to be decoded, the user equipment searches for a next transport block based on a location of a current transport block and the location parameters of the time-frequency resources of the N−1 remaining neighboring downlink transport blocks.

If it is stipulated in the standard that or downlink indication information indicates that the frequency domain interval G between two neighboring transport blocks is used as each of the location parameters of the time-frequency resources of the N−1 remaining downlink transport blocks, the location $(i_k, j_k)$ of the $k(k \geq 2)^{th}$ transport block may be uniquely determined according to the following formula:

$$\begin{cases} i_k = i_{k-1} + 1 \\ j_k = j_{k-1} + S + G - N_f \end{cases}, \text{if } (j_{k-1} + S + G) > N_f, \text{or}$$

$$\begin{cases} i_k = i_{k-1} \\ j_k = j_{k-1} + S + G \end{cases}, \text{if } (j_{k-1} + S + G) \leq N_f$$

If it is stipulated in the standard that or downlink indication information indicates that the quantity X of transport blocks transmitted in each scheduling interval is used as each of the location parameters of the time-frequency resources of the N−1 remaining downlink transport blocks, and $N = X \times T_N + L_N$ is known, where $0 \leq L_N < X$, the location $(i_k, j_k)$ of the $k(k \geq 2)^{th}$ transport block may be uniquely determined according to the following formula:

$$\text{if } L_k > 0, \begin{cases} i_k = i_1 + T_k \\ j_k = \begin{cases} j_{k-1} + S + G - N_f, \text{if } (j_{k-1} + S + G) > N_f \\ j_{k-1} + S + G, \text{if } (j_{k-1} + S + G) \leq N_f \end{cases} \end{cases} ; \text{or}$$

$$\text{if } L_k = 0, \begin{cases} i_k = i_1 + T_k - 1 \\ j_k = \begin{cases} j_{k-1} + S + G - N_f, \text{if } (j_{k-1} + S + G) > N_f \\ j_{k-1} + S + G, \text{if } (j_{k-1} + S + G) \leq N_f \end{cases} \end{cases}.$$

If it is stipulated in the standard that or downlink indication information indicates that another parameter is used as each of the location parameters of the time-frequency resources of the N−1 remaining downlink transport blocks, the location $(i_k, j_k)$ of the $k(k > 2)^{th}$ transport block may be uniquely determined based on the location $(i_1, j_1)$ of the time-frequency resource of the first transport block and the location parameters of the time-frequency resources of the N−1 remaining downlink transport blocks and according to a pre-defined mapping rule of "frequency domain first, time frequency second".

Further, the user equipment jointly decodes k transport blocks, including:

if the k transport blocks are successfully decoded jointly, the user equipment does not process subsequent N−k transport blocks, feeds back ACK information to the base station, and ends current communication; or if the k transport blocks fail to be decoded, the user equipment continues to search for a next transport block; and repeats the process until an $N^{th}$ transport block is found.

Further, the user equipment jointly decodes the N transport blocks, including:

if the N transport blocks are successfully decoded jointly, feeding back ACK information to the base station, and end current communication; or if the N transport blocks fail to be jointly decoded, feeding back NACK information to the base station, to request retransmission, and end current communication.

In the downlink information transmission method provided in this application, according to a resource indication method based on downlink diversity transmission, the downlink resource indication information includes the quantity N of downlink data channel transport blocks, the time-frequency resource location information of the first downlink transport block, and the location parameters of the time-frequency resources of the N−1 remaining downlink transport blocks. The same information bits are encoded into the N transport blocks that can be independently decoded, and diversity transmission is performed on the transport blocks in the downlink data region, to improve reliability of a downlink data channel. In addition, the N transport blocks are mapped to the available resources based on a method of "frequency domain first, time domain second", so that a latency is minimized when reliability is improved. Finally, the downlink resource indication information includes only the quantity N of transport blocks, the location of the first transport block, the time-frequency resource location information of the first downlink transport block, and the location parameters of the time-frequency resources of the N−1 remaining downlink transport blocks, the locations of all transport blocks may be uniquely determined based on the time-frequency resource location information of the first downlink transport block and the location parameters of the time-frequency resources of the N−1 remaining downlink transport blocks and based on the pre-defined mapping mode of "frequency domain first, time domain second", and there is no need to notify the time-frequency resource location of each transport block, thereby reducing downlink control signaling overheads as far as possible.

Figure 5:
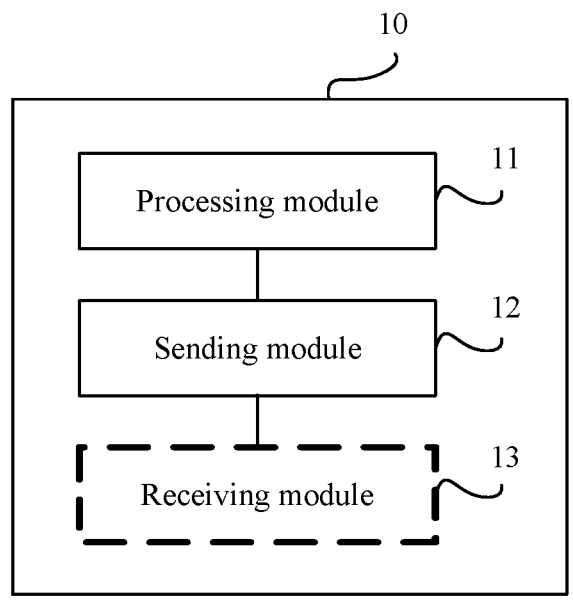
FIG. 5 is a schematic structural diagram of Embodiment 1 of a downlink information transmission apparatus according to this application.

FIG. 5 is a schematic structural diagram of Embodiment 1 of a downlink information transmission apparatus according to this application. As shown in FIG. 5, the downlink information transmission apparatus 10 includes:

a processing module 11, configured to encode to-be-sent information into N transport blocks, where N>1, where the processing module 11 is further configured to determine a time-frequency resource used to send each transport block, where time-frequency resources occupied by at least two transport blocks include a same time domain resource and different frequency domain resources; and a sending module 12, configured to send downlink resource indication information to user equipment, where the downlink resource indication information is used to indicate a time-frequency resource location of an $M^{th}$ transport block in the N transport blocks, and $N \geq M \geq 1$, where the sending module 12 is further configured to send corresponding transport blocks on the determined time-frequency resources.

The downlink information transmission apparatus provided in this embodiment is configured to perform the technical solution on a base station side in any one of the foregoing method embodiments. Implementation principles and technical effects of the downlink information transmission apparatus are similar to those of the technical solution, and details are not described herein again.

During specific implementation of the downlink information transmission apparatus, based on Embodiment 1, the processing module 11 is specifically configured to determine, based on pre-determined available time-frequency resources, the time-frequency resource used to send each transport block, where a first to an $N^{th}$ of the N transport blocks are mapped to the available time-frequency resources in a sequence of "frequency domain first, time domain second".

Optionally, each of the N transport blocks obtained by the processing module 11 through encoding carries the to-be-sent information, and each transport block can be independently decoded; or a first transport block in the N transport blocks obtained by the processing module 11 through encoding carries the to-be-sent information, and the first transport block can be independently decoded; and a remaining transport block in the N transport blocks carries redundancy information or check information of the first transport block, and the remaining transport block and the first transport block can be jointly decoded.

Optionally, the apparatus 10 further includes a receiving module 13; and the sending module 12 is specifically configured to:
send the transport blocks on the determined time-frequency resources in a chronological sequence in time domain until the receiving module receives an acknowledgement message sent by the user equipment.

Optionally, M=1, and the downlink resource indication information sent by the sending module 12 to the user equipment is used to indicate a time domain start location and/or a frequency domain start location of a time-frequency resource occupied by the first transport block.

Optionally, the processing module 11 is further configured to: before determining the time-frequency resource used to send each transport block, obtain unit time-frequency resource information occupied by each transport block, where the unit time-frequency resource information is used to indicate a size of a frequency domain resource occupied by the transport block and a size of a time domain resource occupied by the transport block.

Optionally, M=1, and the downlink resource indication information sent by the sending module 12 to the user equipment is used to indicate a time domain start location and a time domain end location and/or a frequency domain start location and a frequency domain end location that are occupied by the first transport block.

Optionally, the downlink resource indication information sent by the sending module 12 to the user equipment further includes the quantity of transport blocks and/or a location parameter of a time-frequency resource of a transport block other than the $M^{th}$ transport block, and the location parameter of the transport block is used to indicate a relationship between a time-frequency resource location of the transport block and the time-frequency resource location of the $M^{th}$ transport block or is used to indicate a relationship between time-frequency resource locations of two neighboring transport blocks.

Optionally, the location parameter that is of the transport block and that is sent by the sending module 12 to the user equipment includes a frequency domain interval between the transport block and the $M^{th}$ transport block or a frequency domain interval between two neighboring transport blocks.

The downlink information transmission apparatus provided in this embodiment is configured to perform the technical solution on the base station side in any one of the foregoing method embodiments. Implementation principles and technical effects of the downlink information transmission apparatus are similar to those of the technical solution, and details are not described herein again.

Figure 6:
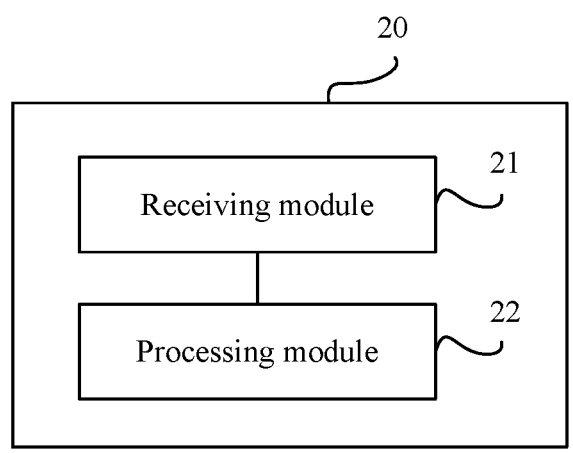
FIG. 6 is a schematic structural diagram of Embodiment 2 of a downlink information transmission apparatus according to this application.

FIG. 6 is a schematic structural diagram of Embodiment 2 of a downlink information transmission apparatus according to this application. As shown in FIG. 6, the downlink information transmission apparatus 20 includes:

a receiving module 21, configured to receive downlink resource indication information sent by a base station, where the downlink resource indication information indicates a time-frequency resource location of an $M^{th}$ transport block in N transport blocks sent by the base station, N>1, and $N \geq M \geq 1$, where the receiving module 21 is further configured to receive, based on the downlink resource indication information, the transport blocks sent by the base station; and a processing module 22, configured to obtain information based on the transport blocks.

The downlink information transmission apparatus provided in this embodiment is configured to perform the technical solution on a user equipment side in any one of the foregoing method embodiments. Implementation principles and technical effects of the downlink information transmission apparatus are similar to those of the technical solution, and details are not described herein again.

During specific implementation of the downlink information transmission apparatus 20, the downlink resource indication information received by the receiving module 21 further includes the quantity of transport blocks and/or a location parameter of a time-frequency resource of a transport block other than the $M^{th}$ transport block, and the location parameter of the transport block is used to indicate a relationship between a time-frequency resource location of the transport block and the time-frequency resource location of the $M^{th}$ transport block or is used to indicate a relationship between time-frequency resource locations of two neighboring transport blocks.

Optionally, M=1, and the downlink resource indication information is used to indicate a first time-frequency resource location occupied by the first transport block, the receiving module 21 is specifically configured to receive, in the first time-frequency resource location, the first transport block sent by the base station;

the processing module 22 is specifically configured to demodulate and decode the first transport block;

if the first transport block fails to be demodulated or decoded, the processing module 22 is further configured to determine, based on the first time-frequency resource location and the pre-obtained location parameter corresponding to another transport block, a time-frequency resource location corresponding to a next transport block sent by the base station, and obtain the transport block that is received in the time-frequency resource location, where the location parameter is used to indicate a relationship between the time-frequency resource location of the transport block and the first time-frequency resource location or is used to indicate the relationship between the time-frequency resource locations of two neighboring transport blocks; and the processing module 22 is configured to jointly demodulate and decode the transport block and all previously received transport blocks, and if the transport block and all the previously received transport blocks fail to be demodulated or decoded, the processing module is further configured to: determine, based on the first time-frequency resource location and the location parameter corresponding to the another transport block, a resource location corresponding to a next transport block, obtain the transport block that is received in the time-frequency resource location, and repeat this step until a received transport block is successfully demodulated and decoded or all transport blocks sent by the base station are received.

Optionally, the processing module 22 is further configured to obtain unit time-frequency resource information occupied by each transport block, where the unit time-frequency resource information is used to indicate a size of a frequency domain resource occupied by the transport block and a size of a time domain resource occupied by the transport block.

Further, the first time-frequency resource location includes a time domain start location and/or a frequency domain start location in which the first transport block is sent, and the processing module 22 is specifically configured to determine, based on the time domain start location and/or the frequency domain start location of the first transport block, the unit time-frequency resource information, and the location parameter corresponding to the another transport block, a time domain start location and/or a frequency domain start location that are/is occupied by the next transport block sent by the base station.

Optionally, the first time-frequency resource location includes a time domain start location and a time domain end location and/or a frequency domain start location and a frequency domain end location of the first transport block; and the processing module 22 is specifically configured to determine, based on the location parameter corresponding to the another transport block and the time domain start location and the time domain end location of the first transport block, a time domain start location and a time domain end location that correspond to the next transport block sent by the base station; and/or determine, based on the location parameter corresponding to the another transport block, the frequency domain start location, and the frequency domain end location, a frequency domain start location and a frequency domain end location that correspond to the next transport block sent by the base station.

Optionally, M>1, and the processing module 22 is specifically configured to determine a first time-frequency resource location of a first transport block based on the time-frequency resource location of the $M^{th}$ transport block and the obtained location parameter of the time-frequency resource of the another transport block;

the receiving module 21 is further configured to receive, in the first time-frequency resource location, the first transport block sent by the base station;

the processing module 22 is further configured to demodulate and decode the first transport block;

if the first transport block fails to be demodulated or decoded, the processing module 22 is further configured to: determine, based on the time-frequency resource location of the $M^{th}$ transport block and the location parameter corresponding to the another transport block, a time-frequency resource location corresponding to a next transport block sent by the base station, and obtain the transport block that is received in the time-frequency resource location, where the location parameter is used to indicate the relationship between the time-frequency resource location of the transport block and the time-frequency resource location of the $M^{th}$ transport block or is used to indicate the relationship between the time-frequency resource locations of two neighboring transport blocks; and the processing module 22 is further configured to: jointly demodulate and decode the transport block and all previously received transport blocks, if the transport block and all the previously received transport blocks fail to be demodulated or decoded, determine, based on the time-frequency resource location of the $M^{th}$ transport block and the location parameter corresponding to the another transport block, a resource location corresponding to a next transport block, obtain the transport block that is received in the time-frequency resource location, and repeat this step until a received transport block is successfully demodulated and decoded or all transport blocks sent by the base station are received.

Optionally, the location parameter that is of the transport block and that is obtained by the processing module 22 includes a frequency domain interval between the transport block and the $M^{th}$ transport block or a frequency domain interval between two neighboring transport blocks.

The downlink information transmission apparatus 20 provided in the foregoing implementation is configured to perform the technical solution on the user equipment side in any one of the foregoing method embodiments. Implementation principles and technical effects of the downlink information transmission apparatus are similar to those of the technical solution, and details are not described herein again.

Figure 7:
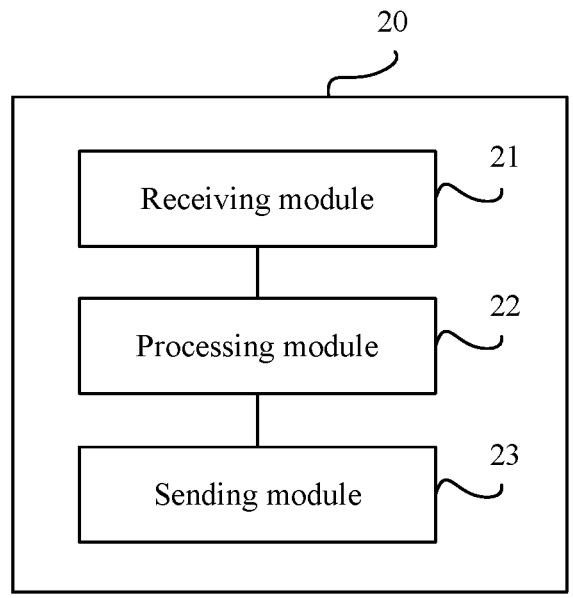
FIG. 7 is a schematic structural diagram of Embodiment 3 of a downlink information transmission apparatus according to this application.

FIG. 7 is a schematic structural diagram of Embodiment 3 of a downlink information transmission apparatus according to this application. As shown in FIG. 7, based on Embodiment 2, the downlink information transmission apparatus 20 further includes a sending module 23, where the sending module 23 is configured to send an acknowledgement message to the base station if the processing module 22 successfully demodulates and decodes a transport block; or the sending module 23 is configured to send a failure message to the base station if the processing module 22 fails to jointly demodulate or decode all transport blocks sent by the base station.

The downlink information transmission apparatus 20 provided in this embodiment is configured to perform the technical solution on the user equipment side in any one of the foregoing method embodiments. Implementation principles and technical effects of the downlink information transmission apparatus are similar to those of the technical solution, and details are not described herein again.

Figure 8:
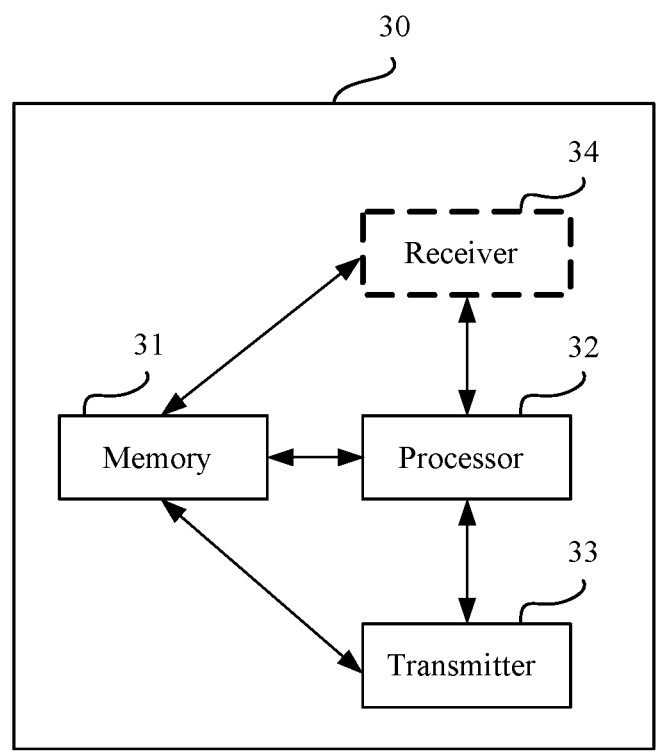
FIG. 8 is a schematic structural diagram of Embodiment 1 of a base station according to this application.

FIG. 8 is a schematic structural diagram of Embodiment 1 of a base station according to this application. As shown in FIG. 8, the base station 30 includes:

a memory 31, configured to store information and a corresponding execution program;

a processor 32, configured to encode to-be-sent information bits into N transport blocks, where N>1, where the processor 32 is further configured to determine a time-frequency resource used to send each transport block, where time-frequency resources occupied by at least two transport blocks include a same time domain resource and different frequency domain resources; and a transmitter 33, configured to send downlink resource indication information to user equipment, where the downlink resource indication information is used to indicate a time-frequency resource location of an $M^{th}$ transport block in the N transport blocks, and N≥M≥1, where the transmitter is further configured to send corresponding transport blocks on the determined time-frequency resources.

Optionally, the processor 32 is specifically configured to determine, based on pre-determined available time-frequency resources, the time-frequency resource used to send each transport block, where a first to an $N^{th}$ of the N transport blocks are mapped to the available time-frequency resources in a sequence of "frequency domain first, time domain second".

Optionally, each of the N transport blocks obtained by the processor 32 through encoding carries the to-be-sent information, and each transport block can be independently decoded; or a first transport block in the N transport blocks obtained by the processor 32 through encoding carries the to-be-sent information, and the first transport block can be independently decoded; and a remaining transport block in the N transport blocks carries redundancy information or check information of the first transport block, and the remaining transport block and the first transport block can be jointly decoded.

Optionally, the base station further includes a receiver 34; and the transmitter 33 is specifically configured to:

send the transport blocks on the determined time-frequency resources in a chronological sequence in time domain until the receiver receives an acknowledgement message sent by the user equipment.

Optionally, M=1, and the downlink resource indication information sent by the transmitter 33 to the user equipment is used to indicate a time domain start location and/or a frequency domain start location of a time-frequency resource occupied by the first transport block.

Optionally, the processor 32 is further configured to: before determining the time-frequency resource used to send each transport block, obtain unit time-frequency resource information occupied by each transport block, where the unit time-frequency resource information is used to indicate a size of a frequency domain resource occupied by the transport block and a size of a time domain resource occupied by the transport block.

Optionally, M=1, and the downlink resource indication information sent by the transmitter 33 to the user equipment is used to indicate a time domain start location and a time domain end location and/or a frequency domain start location and a frequency domain end location that are occupied by the first transport block.

Optionally, the downlink resource indication information sent by the transmitter 33 to the user equipment further includes the quantity of transport blocks and/or a location parameter of a time-frequency resource of a transport block other than the $M^{th}$ transport block, and the location parameter of the transport block is used to indicate a relationship between a time-frequency resource location of the transport block and the time-frequency resource location of the $M^{th}$ transport block or is used to indicate a relationship between time-frequency resource locations of two neighboring transport blocks.

Optionally, the location parameter that is of the transport block and that is sent by the transmitter 33 to the user equipment includes a frequency domain interval between the transport block and the $M^{th}$ transport block or a frequency domain interval between two neighboring transport blocks.

The base station provided in this embodiment is configured to perform the technical solution on the base station side in any one of the foregoing method embodiments. Implementation principles and technical effects of the based station are similar to those of the technical solution, and details are not described herein again.

Figure 9:
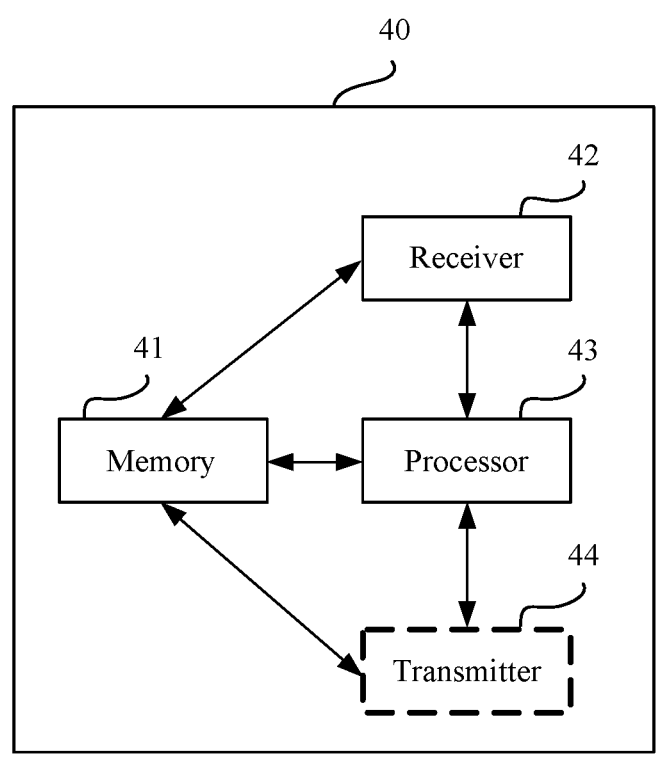
FIG. 9 is a schematic structural diagram of Embodiment 1 of user equipment according to this application.

FIG. 9 is a schematic structural diagram of Embodiment 1 of user equipment according to this application. As shown in FIG. 9, the user equipment 40 includes:

a memory 41, configured to store a corresponding execution program;

a receiver 42, configured to receive downlink resource indication information sent by a base station, where the downlink resource indication information indicates a time-frequency resource location of an $M^{th}$ transport block in N transport blocks sent by the base station, N>1, and N≥M≥1, where the receiver 42 is further configured to receive, based on the downlink resource indication information, the transport blocks sent by the base station; and a processor 43, configured to obtain information based on the transport blocks.

Optionally, the downlink resource indication information received by the receiver 42 further includes the quantity of transport blocks and/or a location parameter of a time-frequency resource of a transport block other than the $M^{th}$ transport block, and the location parameter of the transport block is used to indicate a relationship between a time-frequency resource location of the transport block and the time-frequency resource location of the $M^{th}$ transport block or is used to indicate a relationship between time-frequency resource locations of two neighboring transport blocks.

Optionally, M=1, the downlink resource indication information is used to indicate a first time-frequency resource location occupied by the first transport block, and the receiver 42 is specifically configured to receive, in the first time-frequency resource location, the first transport block sent by the base station;

the processor 43 is specifically configured to demodulate and decode the first transport block;

if the first transport block fails to be demodulated or decoded, the processor 43 is further configured to: determine, based on the first time-frequency resource location and the pre-obtained location parameter corresponding to another transport block, a time-frequency resource location corresponding to a next transport block sent by the base station, and obtain the transport block that is received in the time-frequency resource location, where the location parameter is used to indicate a relationship between the time-frequency resource location of the transport block and the first time-frequency resource location or is used to indicate the relationship between the time-frequency resource locations of two neighboring transport blocks; and the processor 43 is configured to jointly demodulate and decode the transport block and all previously received transport blocks, and if the transport block and all the previously received transport blocks fail to be demodulated or decoded, the processor is further configured to: determine, based on the first time-frequency resource location and the location parameter corresponding to the another transport block, a resource location corresponding to a next transport block, obtain the transport block that is received in the time-frequency resource location, and repeat this step until a received transport block is successfully demodulated and decoded or all transport blocks sent by the base station are received.

Optionally, the processor 43 is further configured to obtain unit time-frequency resource information occupied by each transport block, where the unit time-frequency resource information is used to indicate a size of a frequency domain resource occupied by the transport block and a size of a time domain resource occupied by the transport block.

Optionally, the first time-frequency resource location includes a time domain start location and/or a frequency domain start location in which the first transport block is sent, and the processor 43 is specifically configured to determine, based on the time domain start location and/or the frequency domain start location of the first transport block, the unit time-frequency resource information, and the location parameter corresponding to the another transport block, a time domain start location and/or a frequency domain start location that are/is occupied by the next transport block sent by the base station.

Optionally, the first time-frequency resource location includes a time domain start location and a time domain end location and/or a frequency domain start location and a frequency domain end location of the first transport block; and the processor 43 is specifically configured to determine, based on the location parameter corresponding to the another transport block and the time domain start location and the time domain end location of the first transport block, a time domain start location and a time domain end location that correspond to the next transport block sent by the base station; and/or determine, based on the location parameter corresponding to the another transport block, the frequency domain start location, and the frequency domain end location, a frequency domain start location and a frequency domain end location that correspond to the next transport block sent by the base station.

Optionally, M>1, and the processor 43 is specifically configured to determine a first time-frequency resource location of a first transport block based on the time-frequency resource location of the $M^{th}$ transport block and the obtained location parameter of the time-frequency resource of the another transport block;

the receiver 42 is further configured to receive, in the first time-frequency resource location, the first transport block sent by the base station;

the processor 43 is further configured to demodulate and decode the first transport block;

if the first transport block fails to be demodulated or decoded, the processor 43 is further configured to: determine, based on the time-frequency resource location of the $M^{th}$ transport block and the location parameter corresponding to the another transport block, a time-frequency resource location corresponding to a next transport block sent by the base station, and obtain the transport block that is received in the time-frequency resource location, where the location parameter is used to indicate the relationship between the time-frequency resource location of the transport block and the time-frequency resource location of the $M^{th}$ transport block or is used to indicate the relationship between the time-frequency resource locations of two neighboring transport blocks; and the processor 43 is further configured to: jointly demodulate and decode the transport block and all previously received transport blocks, if the transport block and all the previously received transport blocks fail to be demodulated or decoded, determine, based on the time-frequency resource location of the $M^{th}$ transport block and the location parameter corresponding to the another transport block, a resource location corresponding to a next transport block, obtain the transport block that is received in the time-frequency resource location, and repeat this step until a received transport block is successfully demodulated and decoded or all transport blocks sent by the base station are received.

Optionally, the location parameter that is of the transport block and that is obtained by the processor 43 includes a frequency domain interval between the transport block and the $M^{th}$ transport block or a frequency domain interval between two neighboring transport blocks.

Optionally, the user equipment further includes:

a transmitter 44, configured to send an acknowledgement message to the base station if the processor 43 successfully demodulates and decodes a transport block.

Optionally, the user equipment further includes:

a transmitter 44, configured to send a failure message to the base station if the processor 43 fails to jointly demodulate or decode all transport blocks sent by the base station.

The user equipment provided in this embodiment is configured to perform the technical solution on the user equipment side in any one of the foregoing method embodiments. Implementation principles and technical effects of the user equipment are similar to those of the technical solution, and details are not described herein again.

This application further provides a storage medium, including a readable storage medium and a computer program, where the computer program is used to implement any downlink information transmission method provided on a base station side.

This application further provides a storage medium, including a readable storage medium and a computer program, where the computer program is used to implement any downlink information transmission method provided on a user equipment side.

This application further provides a program product. The program product includes a computer program (that is, an execution instruction), and the computer program is stored in a readable storage medium. At least one processor of a base station can read the computer program from the readable storage medium, and the at least one processor executes the computer program, so that the base station implements the downlink information transmission method provided in the foregoing implementations.

This application further provides a program product. The program product includes a computer program (that is, an execution instruction), and the computer program is stored in a readable storage medium. At least one processor of user equipment can read the computer program from the readable storage medium, and the at least one processor executes the computer program, so that the user equipment implements the downlink information transmission method provided in the foregoing implementations.

It should be understood that in the foregoing user equipment and base station embodiments, the processor may be a central processing unit (CPU for short), or may be another general purpose processor, a digital signal processor (DSP for short), an application specific integrated circuit (ASIC for short), or the like. The general purpose processor may be a microprocessor, or the processor may be any conventional processor or the like. The steps of the method disclosed with reference to the embodiments of this application may be directly performed by a hardware processor, or may be performed by using a combination of hardware in the processor and a software module.

A person of ordinary skill in the art may understand that all or some of the steps of the method embodiments may be implemented by a program instructing related hardware. The program may be stored in a computer-readable memory. When the program is executed, the steps in the method embodiments are performed. The memory (the storage medium) includes: a read-only memory (ROM for short), a RAM, a flash memory, a hard disk, a solid state disk, a magnetic tape, a floppy disk, an optical disc, and any combination thereof.

Finally, it should be noted that the foregoing embodiments are merely intended for describing the technical solutions of this application, rather than limiting this application.

What is claimed is:

1. A downlink information transmission method, comprising:
    encoding to-be-sent information into N transport blocks, wherein N>1;
    determining a time-frequency resource used to send each transport block of the N transport blocks, wherein time-frequency resources occupied by at least two transport blocks comprise a same time domain resource and different frequency domain resources;
    sending downlink resource indication information to a user equipment, wherein the downlink resource indication information is used to indicate a time-frequency resource location of an $M^{th}$ transport block in the N transport blocks, and N≥M≥1; and
    sending corresponding transport blocks on the determined time-frequency resources, and
    wherein the downlink resource indication information further comprises one or both of a quantity of transport blocks and a location parameter of a time-frequency resource of a transport block other than the $M^{th}$ transport block, and the location parameter of the transport block other than the $M^{th}$ transport block is used to indicate a relationship between a time-frequency resource location of the transport block other than the $M^{th}$ transport block and the time-frequency resource location of the $M^{th}$ transport block or is used to indicate a relationship between time-frequency resource locations of two neighboring transport blocks.

2. The method according to claim 1, wherein the determining a time-frequency resource used to send each transport block comprises:
    determining, based on pre-determined available time-frequency resources, the time-frequency resource used to send each transport block, wherein a first to an $N^{th}$ of the N transport blocks are mapped to the available time-frequency resources in a sequence of frequency domain first, time domain second.

3. The method according to claim 1, wherein each of the N transport blocks carries to-be-sent information, and each transport block can be independently decoded; or
    a first transport block in the N transport blocks carries the to-be-sent information, and the first transport block can be independently decoded; and a remaining transport block in the N transport blocks carries redundancy information or check information of the first transport block, and the remaining transport block and the first transport block can be jointly decoded.

4. The method according to claim 1, wherein the sending corresponding transport blocks on the determined time-frequency resources comprises:
    sending the corresponding transport blocks on the determined time-frequency resources in a chronological sequence in a time domain until an acknowledgement message sent by the user equipment is received.

5. The method according to claim 1, wherein M=1, and the downlink resource indication information is used to indicate a time domain start location and/or a frequency domain start location of a time-frequency resource occupied by the first transport block.

6. The method according to claim 5, wherein before the determining a time-frequency resource used to send each transport block, the method further comprises:
    obtaining unit time-frequency resource information occupied by each transport block, wherein the unit time-frequency resource information is used to indicate a size of a frequency domain resource occupied by the transport block and a size of a time domain resource occupied by the transport block.

7. The method according to claim 1, wherein M=1, and the downlink resource indication information is used to indicate a time domain start location and a time domain end location and/or a frequency domain start location and a frequency domain end location that are occupied by the first transport block.

8. The method according to claim 1, wherein the location parameter of the transport block other than the $M^{th}$ transport block comprises a frequency domain interval between the transport block other than the $M^{th}$ transport block and the $M^{th}$ transport block or a frequency domain interval between two neighboring transport blocks.

9. An information transmission method, comprising:
    receiving downlink resource indication information sent by a base station, wherein the downlink resource indication information indicates a time-frequency resource location of an $M^{th}$ transport block in N transport blocks sent by the base station, N>1, and N≥M≥1; and
    receiving, based on the downlink resource indication information, the N transport blocks sent by the base station, and obtaining information based on the N transport blocks, and
    wherein the downlink resource indication information further comprises one or both of a quantity of transport blocks and a location parameter of a time-frequency resource of a transport block other than the $M^{th}$ transport block, and the location parameter of the transport block other than the $M^{th}$ transport block is used to indicate a relationship between a time-frequency resource location of the transport block other than the $M^{th}$ transport block and the time-frequency resource location of the $M^{th}$ transport block or is used to indicate a relationship between time-frequency resource locations of two neighboring transport blocks.

10. The method according to claim 9, wherein M=1, the downlink resource indication information is used to indicate a first time-frequency resource location occupied by the first transport block, and the receiving, based on the downlink resource indication information, the N transport blocks sent by the base station, and obtaining information based on the N transport blocks comprises:
  receiving, in the first time-frequency resource location, the first transport block sent by the base station;
  demodulating and decoding the first transport block;
  when the first transport block fails to be demodulated or decoded, determining, based on the first time-frequency resource location and the pre-obtained location parameter corresponding to another transport block, a time-frequency resource location corresponding to a next transport block sent by the base station, and obtaining the transport block that is received in the time-frequency resource location, wherein the location parameter is used to indicate a relationship between the time-frequency resource location of the transport block and the first time-frequency resource location or is used to indicate the relationship between the time-frequency resource locations of two neighboring transport blocks; and
  jointly demodulating and decoding the transport block and all previously received transport blocks, when the transport block and all the previously received transport blocks fail to be demodulated or decoded, determining, based on the first time-frequency resource location and the location parameter corresponding to the another transport block, a resource location corresponding to a next transport block, obtaining the transport block that is received in the time-frequency resource location, and repeating this step until a received transport block is successfully demodulated and decoded or all transport blocks sent by the base station are received.

11. The method according to claim 10, wherein before the receiving downlink resource indication information sent by the base station, the method further comprises:
  obtaining unit time-frequency resource information occupied by each transport block, wherein the unit time-frequency resource information is used to indicate a size of a frequency domain resource occupied by the transport block and a size of a time domain resource occupied by the transport block.

12. The method according to claim 11, wherein the first time-frequency resource location comprises a time domain start location and/or a frequency domain start location in which the first transport block is sent, and the determining, based on the first time-frequency resource location and the location parameter corresponding to the another transport block, a time-frequency resource location corresponding to a next transport block sent by the base station comprises:
  determining, based on the time domain start location and/or the frequency domain start location of the first transport block, the unit time-frequency resource information, and the location parameter corresponding to the another transport block, a time domain start location and/or a frequency domain start location that are/is occupied by the next transport block sent by the base station.

13. The method according to claim 10, wherein the first time-frequency resource location comprises a time domain start location and a time domain end location and/or a frequency domain start location and a frequency domain end location of the first transport block; and
  the determining, based on the first time-frequency resource location and the location parameter corresponding to the another transport block, a time-frequency resource location corresponding to a next transport block sent by the base station comprises:
  determining, based on the location parameter corresponding to the another transport block and the time domain start location and the time domain end location of the first transport block, a time domain start location and a time domain end location that correspond to the next transport block sent by the base station; and/or determining, based on the location parameter corresponding to the another transport block, the frequency domain start location, and the frequency domain end location, a frequency domain start location and a frequency domain end location that correspond to the next transport block sent by the base station.

14. The method according to claim 9, wherein M>1, and the receiving, based on the downlink resource indication information, the N transport blocks sent by the base station, and obtaining information based on the N transport blocks comprises:
  determining a first time-frequency resource location of a first transport block based on the time-frequency resource location of the $M^{th}$ transport block and the obtained location parameter of the time-frequency resource of another transport block;
  receiving, in the first time-frequency resource location, the first transport block sent by the base station;
  demodulating and decoding the first transport block;
  when the first transport block fails to be demodulated or decoded, determining, based on the time-frequency resource location of the $M^{th}$ transport block and the location parameter corresponding to the another transport block, a time-frequency resource location corresponding to a next transport block sent by the base station, and obtaining the transport block that is received in the time-frequency resource location, wherein the location parameter is used to indicate the relationship between the time-frequency resource location of the transport block and the time-frequency resource location of the $M^{th}$ transport block or is used to indicate the relationship between the time-frequency resource locations of two neighboring transport blocks; and
  jointly demodulating and decoding the transport block and all previously received transport blocks, when the transport block and all the previously received transport blocks fail to be demodulated or decoded, determining, based on the time-frequency resource location of the $M^{th}$ transport block and the location parameter corresponding to the another transport block, a resource location corresponding to a next transport block, obtaining the transport block that is received in the time-frequency resource location, and repeating this step until a received transport block is successfully demodulated and decoded or all transport blocks sent by the base station are received.

15. The method according to claim 9, wherein the location parameter of the transport block comprises a frequency domain interval between the transport block and the $M^{th}$ transport block or a frequency domain interval between two neighboring transport blocks.

16. The method according to claim 9, wherein the method further comprises:
   sending an acknowledgement message to the base station when a transport block is successfully demodulated and decoded.

17. The method according to claim 9, wherein the method further comprises:
   sending a failure message to the base station when all N transport blocks sent by the base station fail to be jointly demodulated or decoded.

18. A downlink information transmission apparatus, comprising:
   a processor, configured to encode to-be-sent information into N transport blocks, wherein N>1, wherein
   the processor is further configured to determine a time-frequency resource used to send each transport block of the N transport blocks, wherein time-frequency resources occupied by at least two transport blocks comprise a same time domain resource and different frequency domain resources; and
   a transmitter, configured to send downlink resource indication information to a user equipment, wherein the downlink resource indication information is used to indicate a time-frequency resource location of an $M^{th}$ transport block in the N transport blocks, and $N \geq M \geq 1$, wherein
   the transmitter is further configured to send corresponding transport blocks on the determined time-frequency resources, and
   wherein the downlink resource indication information further comprises one or both of a quantity of transport blocks and a location parameter of a time-frequency resource of a transport block other than the $M^{th}$ transport block, and the location parameter of the transport block other than the $M^{th}$ transport block is used to indicate a relationship between a time-frequency resource location of the transport block other than the $M^{th}$ transport block and the time-frequency resource location of the $M^{th}$ transport block or is used to indicate a relationship between time-frequency resource locations of two neighboring transport blocks.

* * * * *